United States Patent
Matsusue et al.

(10) Patent No.: US 8,689,035 B2
(45) Date of Patent: Apr. 1, 2014

(54) COMMUNICATION SYSTEM, COMMUNICATION INTERFACE, AND SYNCHRONIZATION METHOD

(75) Inventors: Naoya Matsusue, Kawasaki (JP); Kanta Yamamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 332 days.

(21) Appl. No.: 13/209,006

(22) Filed: Aug. 12, 2011

(65) Prior Publication Data
US 2012/0079310 A1 Mar. 29, 2012

(30) Foreign Application Priority Data
Sep. 28, 2010 (JP) ................... 2010-216498

(51) Int. Cl.
| | | |
|---|---|---|
| G06F 1/12 | (2006.01) | |
| H03K 19/00 | (2006.01) | |
| H03L 7/00 | (2006.01) | |
| H03B 5/08 | (2006.01) | |
| H04B 7/212 | (2006.01) | |
| H04J 3/06 | (2006.01) | |
| H04L 7/00 | (2006.01) | |
| G06F 15/16 | (2006.01) | |
| G06F 3/00 | (2006.01) | |
| G06F 13/42 | (2006.01) | |

(52) U.S. Cl.
USPC ............ 713/400; 326/93; 327/141; 331/172; 370/324; 370/350; 370/503; 375/354; 709/248; 710/58; 710/105

(58) Field of Classification Search
USPC ............ 713/400; 326/93; 327/141; 331/172; 370/324, 350, 503; 375/354; 709/248; 710/58, 105
See application file for complete search history.

(56) References Cited

U.S. PATENT DOCUMENTS

| | | | | |
|---|---|---|---|---|
| 5,757,786 A | * | 5/1998 | Joo | 370/324 |
| 5,929,711 A | * | 7/1999 | Ito | 331/1 A |
| 8,384,707 B2 | * | 2/2013 | Kennedy et al. | 345/213 |

FOREIGN PATENT DOCUMENTS

| | | |
|---|---|---|
| JP | 7-287083 A | 10/1995 |
| JP | 2008-182385 A | 8/2008 |

OTHER PUBLICATIONS

Eidson, John C. et al., "IEEE Standard for a Precision Clock Synchronization Protocol for Networked Measurement and Control Systems", IEEE Std 1588-2008 (Revision of IEEE Std 1588-2002), Jul 24, 2008, pp. 1-269.

* cited by examiner

*Primary Examiner* — Stefan Stoynov
(74) *Attorney, Agent, or Firm* — Fujitsu Patent Center

(57) ABSTRACT

An interface board includes a synchronizer that synchronizes a first time that is a time of the interface board to a base time based on a master synchronization signal that is supplied by an external master time source and that defines the base time. The interface board also includes a comparator that compares a phase of a first synchronization signal that synchronizes to the first time with a phase of a shared synchronization signal sent by an interface controller that controls the interface board, and a notifier that notifies another interface board of a comparison result of the comparator.

19 Claims, 20 Drawing Sheets

FIG. 8A

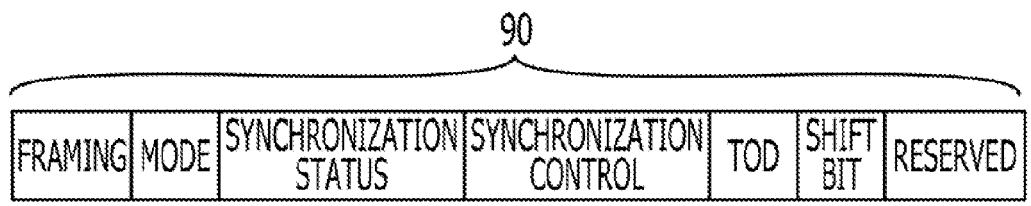

FIG. 8B

| FIELD NAME | | CONTENTS |
|---|---|---|
| FRAMING | | FIXED VALUE FOR FRAMING |
| MODE | 0 | PPS SYNCHRONIZATION OF MASTER |
| | 1 | PPS SYNCHRONIZATION OF SLAVE |
| SYNCHRONIZATION STATUS | 00 | DO NOT USE FRAME FOR PPS SYNCHRONIZATION |
| | 01 | PPS SYNCHRONIZATION BEING CONDUCTED |
| | 10 | PPS SYNCHRONIZATION COMPLETED |
| SYNCHRONIZATION CONTROL | 00 | NO ACTION |
| | 01 | NOTIFICATION OF CURRENT SHIFT BIT VALUE TO SHIFT REGISTER |
| | 10 | REQUEST FOR NOTIFICATION OF CURRENT SHIFT BIT VALUE TO SHIFT REGISTER |
| | 11 | REQUEST USE OF SHIFT BIT |
| TOD | | TOD (TIME OF DAY) INFORMATION |
| SHIFT BIT | | SHIFT BIT INFORMATION (PHASE DIFFERENCE INFORMATION) |

COMMUNICATION SYSTEM, COMMUNICATION INTERFACE, AND SYNCHRONIZATION METHOD

CROSS-REFERENCE TO RELATED APPLICATION

This application is based upon and claims the benefit of priority of the prior Japanese Patent Application No. 2010-216498 filed on Sep. 28, 2010, the entire contents of which are incorporated herein by reference.

FIELD

The embodiments discussed herein are related to, for example, a communication interface of an interface board and the like for conducting communication, a communication system having multiple communication interfaces, and a synchronization method for a communication system.

BACKGROUND

IEEE 1588 has been proposed as a technique for synchronizing the times of certain devices on a network with less than one microsecond precision. For example, the synchronization method based on IEEE 1588 is implemented by a grandmaster-mode device coupled to a precise time source such as a GPS (Global Positioning System) satellite, a standard radio wave, an atomic clock or the like; a boundary-clock-mode device that relays time information transmitted from the grandmaster-mode device; and an ordinary-clock-mode device in which the time information transmitted from the boundary clock mode is terminated.

The grandmaster-mode device receives TOD (time of day) and PPS (pulse per second) information from a precise time source such as a GPS satellite to synchronize the time of the grandmaster-mode device. The boundary-clock-mode and ordinary-clock-mode devices use PTP (precision time protocol) to send PTP packets to ask the grandmaster-mode device the time at an arbitrary timing.

The grandmaster-mode device receives the PTP packet used to request the time. The grandmaster-mode device sends a time notification PTP packet that includes the TOD and PPS information to the boundary-clock-mode device and the ordinary-clock-mode device that sent the PTP packets requesting the time, after stamping the transmission time on the time notification PTP packet.

The boundary-clock-mode device and the ordinary-clock-mode device use a timestamp of the time when sending the PTP packet requesting the time and the timestamp of the time notification PTP packet to calculate a delay time in the transmission path. The boundary-clock-mode device and the ordinary-clock-mode device synchronize the times thereof by correcting the times with respect to the time of the time notification PTP packet sent by the grandmaster-mode device based on the delay time.

Japanese Laid-open Patent Publication No. 7-287083A, for example, is disclosed as a related art document relating to the above technology.

SUMMARY

According to an aspect of the invention, an interface board is provided comprising a synchronizer that synchronizes a first time that is a time of the interface board to a base time based on a master synchronization signal that is supplied by an external master time source and that defines the base time, a comparator that compares a phase of a first synchronization signal that synchronizes to the first time with a phase of a certain shared synchronization signal sent by an interface controller that controls the interface board, and a notifier that notifies another interface board of a comparison result of the comparator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 8A to 8C illustrate a frame configuration of a TOD/PPS information frame.

DESCRIPTION OF EMBODIMENTS

Embodiments will be illustrated hereinbelow with reference to the drawings. In the following description, a transmission device is used as an example of a communication system. The transmission device includes multiple interface boards mounted with multiple slots intercoupled through, for example, a back wiring board.

(1) Configuration

A configuration of a communication system 1 of the present embodiment is illustrated and is described below with reference to FIGS. 1 to 4.

(1-1) Overall Configuration

An overall configuration of the communication system 1 of the present embodiment is described with reference to FIG. 1.

Figure 1:
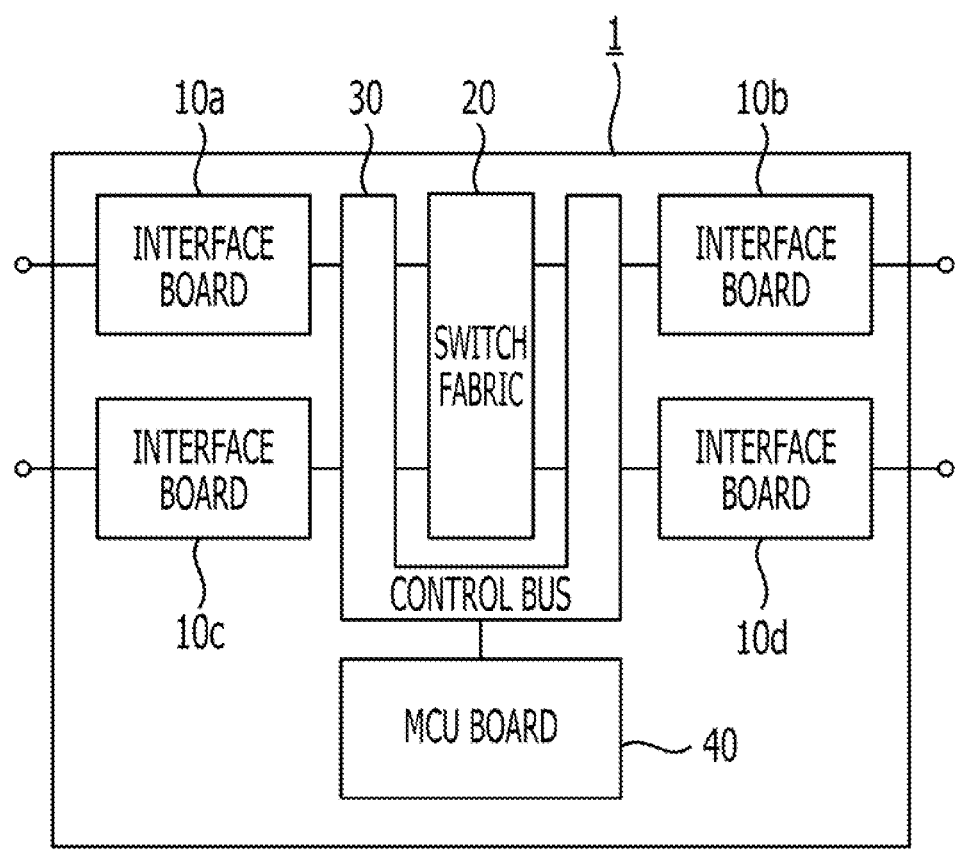
FIG. 1 illustrates an overall configuration of a communication system.

FIG. 1 is a block diagram illustrating the overall configuration of the communication system 1 of the present embodiment.

As illustrated in FIG. 1, the communication system 1 includes interface boards 10a to 10d which each represent examples of "communication interfaces," a switch fabric 20, a control bus 30, and an MCU board (centralized monitoring and control panel) 40 as an example of an "interface controller." The interface boards 10a to 10d will be referred to as "interface boards 10" when there is no distinction between the interface boards 10a to 10d in the following explanations. Moreover, the number of interface boards 10 illustrated in FIG. 1 is merely an example and the communication system 1 may have any number of interface boards 10. However, the communication system 1 preferably includes a plurality of (that is, two or more) interface boards 10. Furthermore, the interface boards 10a to 10d may be detachably installed in the communication system 1, or may be fixed in the communication system 1.

The interface boards 10a to 10d are coupled to each other through the switch fabric 20. The interface boards 10a to 10d use a data plane formed by the switch fabric 20 to send packets (or other types of data) back and forth.

The interface boards 10a to 10d are each coupled to external terminal devices through optical input/output ports. Examples of possible terminal devices include information processors and network processing equipment such as personal computers, workstations, network terminals, and routers, for example. Packets inputted into the communication system 1 are transferred to other devices through the interface boards 10 and the switch fabric 20, for example.

The interface boards 10a to 10d and the MCU board 40 are all coupled to each other through the control bus 30. The interface boards 10a to 10d and the MCU board 40 may use, for example, a control plane formed by the control bus 30 to send and receive arbitrary information (for example, control information such as TOD/PPS information frames 90 and time base clocks to be later described, and the like).

(1-2) Configuration of Interface Board

Figure 2:
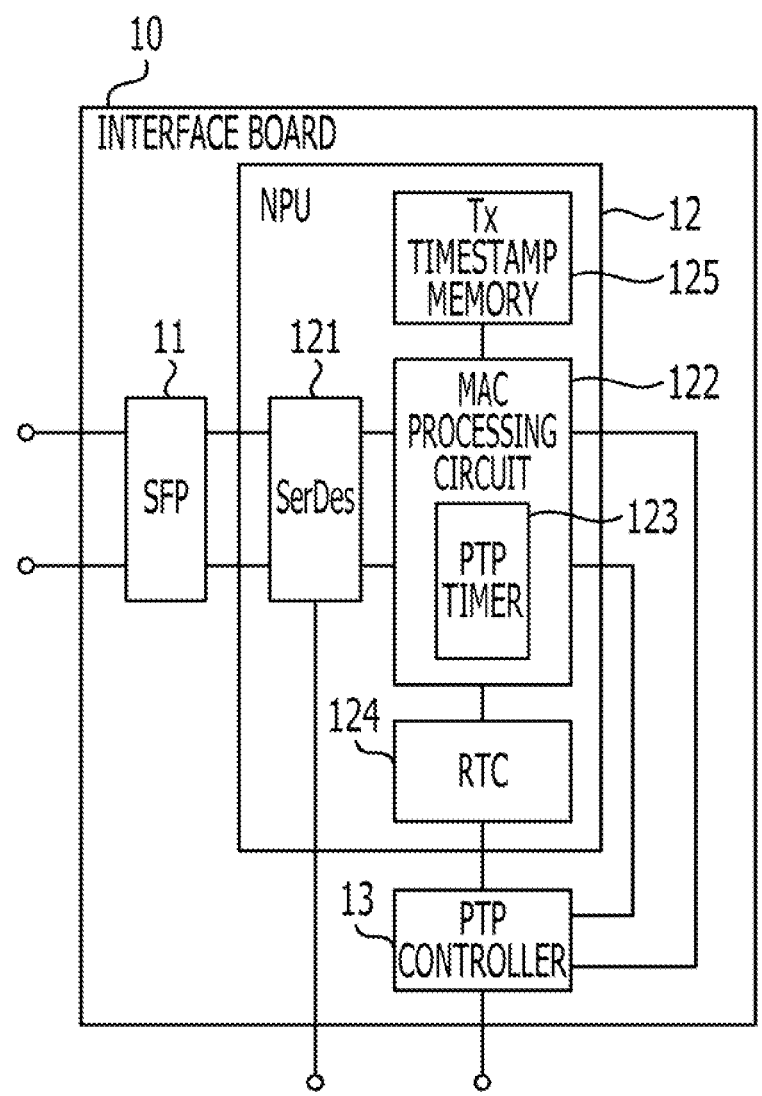
FIG. 2 illustrates a configuration of an interface board.
Figure 3:
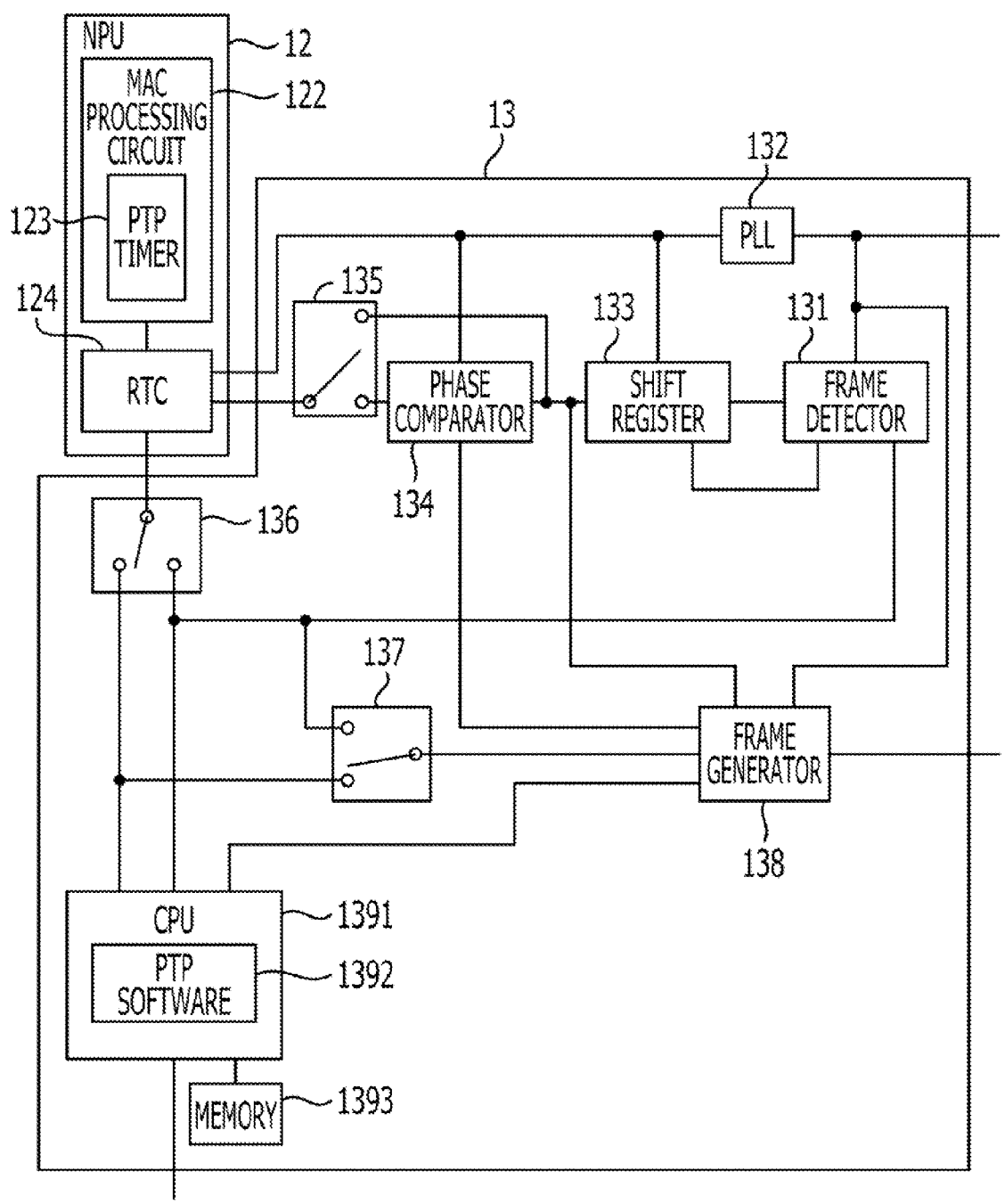
FIG. 3 illustrates a configuration of a PTP controller included in the interface board.

A configuration of the interface board 10 will be described with reference to FIGS. 2 and 3. FIG. 2 is a block diagram illustrating a configuration of the interface board 10. FIG. 3 is a block diagram illustrating a configuration of a PTP controller 13 included in the interface board 10.

As illustrated in FIG. 2, the interface board 10 includes an SFP (Small Form Factor Pluggable) 11, an NPU (Network Processor Unit) 12, and a PTP (Precision Time Protocol) controller 13.

The SFP 11 receives packets sent as optical signals to the communication system 1 from external devices through optical input/output ports, and transmits the received packets after having been converted to electrical signals to the NPU 12. Similarly, the SFP 11 receives packets outputted by the NPU 12 and converts the packets to electrical signals, and then sends the converted packets to the external devices through the optical input/output ports.

The NPU 12 controls transmission of the packets. Specifically, the NPU 12 includes a SerDes (Serializer/Deserializer) 121, a MAC (Media Access Control) processing circuit 122, a RTC (Real Time Clock) 124, and a Tx timestamp memory 125.

The SerDes 121 conducts serial/parallel conversion on packets transmitted by the MAC processing circuit 122 and outputs the serial/parallel converted packets to the SFP 11. Similarly, the SerDes 121 conducts serial/parallel conversion on packets outputted by the SFP 11 and outputs the serial/parallel converted packets to the MAC processing circuit 122.

In addition, the SerDes 121 generates a line recovered clock synchronized with a packet receiving timing (for example, the receiving timing of a PTP packet) by using a line reference clock outputted by the MCU board 40 as a reference signal. The SerDes 121 outputs the generated line recovered clock to the MCU board 40.

The MAC processing circuit 122 conducts reception and transmission processing (for example, reception and transmission in a MAC layer) on packets sent from and received by the SFP 11. For example, the MAC processing circuit 122 conducts certain reception processing on the packets received by the SFP 11 and outputs the reception-processed packets to a MAC processing circuit 122 of another interface board 10 through a switch fabric 20. Similarly, the MAC processing circuit 122 conducts certain transmission processing on packets outputted from a MAC processing circuit 122 of another interface board 10 through the switch fabric 20. The transmission-processed packets are outputted to the SFP 11 through the SerDes 121.

In the present embodiment, in addition to or in place of normal packets sent from a terminal device, the SFP 11 may send and receive a PTP packet as an example of a "master synchronization signal" to and from a grandmaster-mode device according to IEEE 1588. The grandmaster-mode device is an example of a "master time source." The grandmaster-mode device is a device that directly receives time information such as TOD (Time of Day) and PPS (Pulse Per Second) and the like from, for example, a GPS satellite and the like.

Therefore, the MAC processing circuit 122 may send and receive PTP packets. Specifically, the MAC processing circuit 122 conducts certain reception processing on received PTP packets and outputs the reception-processed PTP packets to the PTP controller 13. The MAC processing circuit 122 includes a PTP timer 123 that can embed the time the PTP packet was received into the PTP packet. The MAC processing circuit 122 may output the PTP packet embedded with the time the PTP packet was received, to the PTP controller 13.

Similarly, the MAC processing circuit 122 conducts certain transmission processing on the PTP packets outputted from the PTP controller 13 and outputs the transmission-processed PTP packets to the SFP 11 through the SerDes 121. At this time, the MAC processing circuit 122 may store in the Tx time stamp memory 125 the time the PTP packet was received identified by the operation of the PTP timer 123 included in the MAC processing circuit 122, and may notify the grandmaster-mode device of that time.

The RTC 124 is an example of a "first synchronizing unit" and a "second synchronizing unit," and outputs clock data (for example, year, month, day, time, minute, second, and the like), PPS information, and the like.

The Tx timestamp memory 125 stores a Tx timestamp indicating the time the MAC processing circuit 122 sent a PTP packet.

The PTP controller 13 controls the sending and receiving of PTP packets to and from the grandmaster-mode device and controls the operation of the RTC 124 according to the received PTP packets when the interface board 10 is operating as a master (within a master mode). Additionally, the PTP controller 13 notifies the MCU 40 through the control bus 30 about TOD/PPS information frames 90 that indicate the synchronization state of the PTP controller 13. For example, the TOD/PPS information frames 90 indicates shift bit information (later described in more detail) that includes a difference between the PPS phases outputted by the RTC 124 and −/+9 shared PPS phases sent by the MCU board 40 within the communication system.

Conversely, when the interface board 10 operates as a slave (within a slave mode), the PTP controller 13 controls the operation of the RTC 124 according to the TOD/PPS information frame 90 that is sent by the MCU board 40 and that indicates the synchronization state of the interface board 10 operating in a master mode.

According to the present embodiment, multiple interface boards 10 are preferably differentiated as either interface boards 10 operating in a master mode, or interface boards 10 operating in a slave mode. An interface board 10 operating in the master mode (referred to hereinafter as "master mode interface board 10") is an example of a "first interface" and is coupled directly to, for example, a grandmaster-mode device. Hence, the RTC 124 included in the master mode interface board 10 outputs synchronization signals such as PPS according to PTP packets sent by the grandmaster-mode device. Conversely, an interface board 10 operating in the slave mode (referred to hereinafter as "slave mode interface board 10") is an example of a "second interface" and is not coupled directly to, for example, a grandmaster-mode device. Hence, the RTC 124 included in the slave mode interface board 10 outputs synchronization signals such as PPS according to comparison result of the phases of PPS of the master mode interface board 10.

As illustrated in FIG. 3, the PTP controller 13 includes a frame detector 131, a PLL (Phase Locked Loop) 132 as an example of a "first generator," a shift register 133 as an example of a "second synchronizer," a phase comparator 134 as an example of a "first comparator," a selector (switch) 135, a selector (switch) 136, a selector (switch) 137, a frame generator 138 as an example of a "first notifier," a CPU 1391, and a memory 1393.

The frame detector 131 detects a TOD/PPS information frame 90 sent by the MCU board 40. The frame detector 131 transfers all or part of the information included in the detected TOD/PPS information frame 90 to at least one of: the shift register 133, one terminal of the selector 136, and one terminal of the selector 137. Additionally, the frame detector 131 outputs a shared PPS corresponding to the period (or timing) in which the TOD/PPS information frame 90 was received, to the shift register 133. The shared PPS outputted by the frame detector 131 is an example of a "shared synchronization signal."

The PLL 132 sends a time base clock sent by the MCU board 40 to the shift register 133, the phase comparator 134, and the RTC 124. Therefore, the shift register 133, the phase comparator 134, and the RTC 124 each operate according to the time base clock. Additionally, the PLL 132 creates a high frequency clock with a frequency higher than the time base clock by frequency-dividing the time base clock sent by the MCU board 40. The PLL 132 outputs the created high frequency clock to the shift register 133.

The shift register 133 shifts the shared PPS outputted by the frame detector 131 only by the phase amount indicated in the shift bit information included in the TOD/PPS information frame 90 detected by the frame detector 131. The shift register 133 outputs the shifted shared PPS to the phase comparator 134.

The phase comparator 134 compares the phase of the shared PPS outputted by the shift register 133 with the phase of the PPS outputted by the RTC 124. The phase comparator 134 outputs shift bit information that indicates the phase comparison result (that is, the difference in phases) to the frame generator 138.

The selector 135 connects the RTC 124 and the phase comparator 134 to allow the PPS outputted by the RTC 124 to be inputted in the phase comparator 134 when the interface board 10 is operating in the master mode. That is, the selector 135 turns on the bottom terminal (illustrated in FIG. 3) thereof when the interface board is operating in the master mode.

Conversely, the selector 135 connects the RTC 124 and the shift register 133 to allow the PPS outputted by the shift register 133 to be inputted in the RTC 124 when the interface board 10 is operating in the slave mode. That is, the selector 135 turns on the top terminal (illustrated in FIG. 3) thereof when the interface board is operating in the slave mode.

The selector 136 connects the CPU 1391 and the RTC 124 to allow the TOD outputted by the CPU 1391 to be inputted in the RTC 124 when the interface board is in the master mode. That is, the selector 136 turns on the left side terminal (illustrated in FIG. 3) thereof when the interface board 10 is operating in the master mode.

Conversely, the selector 136 connects the RTC 124 and the frame detector 131 to allow the TOD outputted by the frame detector 131 to be inputted in the RTC 124 when the interface board 10 is in the slave mode. That is, the selector 136 turns on the right side terminal (illustrated in FIG. 3) thereof when the interface board 10 is operating in the slave mode.

The selector 137 connects the CPU 1391 and the frame generator 138 to allow the TOD outputted by the CPU 1391 to be inputted in the frame generator 138 when the interface board 10 is in the master mode. That is, the selector 137 turns on the bottom terminal (illustrated in FIG. 3) thereof when the interface board 10 is operating in the master mode.

Conversely, the selector 137 connects the frame generator 138 and the frame detector 131 to allow the TOD outputted by the frame detector 131 to be inputted in the frame generator 138 when the interface board 10 is in the slave mode. That is, the selector 137 turns on the top terminal (illustrated in FIG. 3) thereof when the interface board 10 is operating in the slave mode.

The frame generator 138 generates a TOD/PPS information frame 90 that includes the TOD and a status outputted by the CPU 1391 and shift bit information outputted by the phase comparator 134 when the interface board 10 is operating in the master mode. Conversely, the frame generator 138 generates a TOD/PPS information frame 90 that includes the TOD outputted by the frame detector 131 and the status outputted by the CPU 1391 when the interface board 10 is operating in the slave mode. The frame generator 138 sends the TOD/PPS information frame 90 to the MCU board 40 through the control bus 30.

The CPU 1391 executes software in the PTP controller 13. For example, the CPU 1391 can read PTP software 1392 from the memory 1393. The PTP software 1392 is a program that conducts processing on the abovementioned PTP packets and is illustrated in the CPU 1391 for the sake of convenience. For example, the PTP software 1392 executes (1) processing to obtain TOD and the like included in PTP packets. Then, the PTP software 1392 executes (2) processing to output the obtained TOD to the RTC 124.

The memory 1393 may store temporary parameters used in the operations of the CPU 1391. Furthermore, the memory 1393 stores software (for example, firmware) and the like for operating the CPU 1391.

(1-3) MCU Board Configuration

Figure 4:
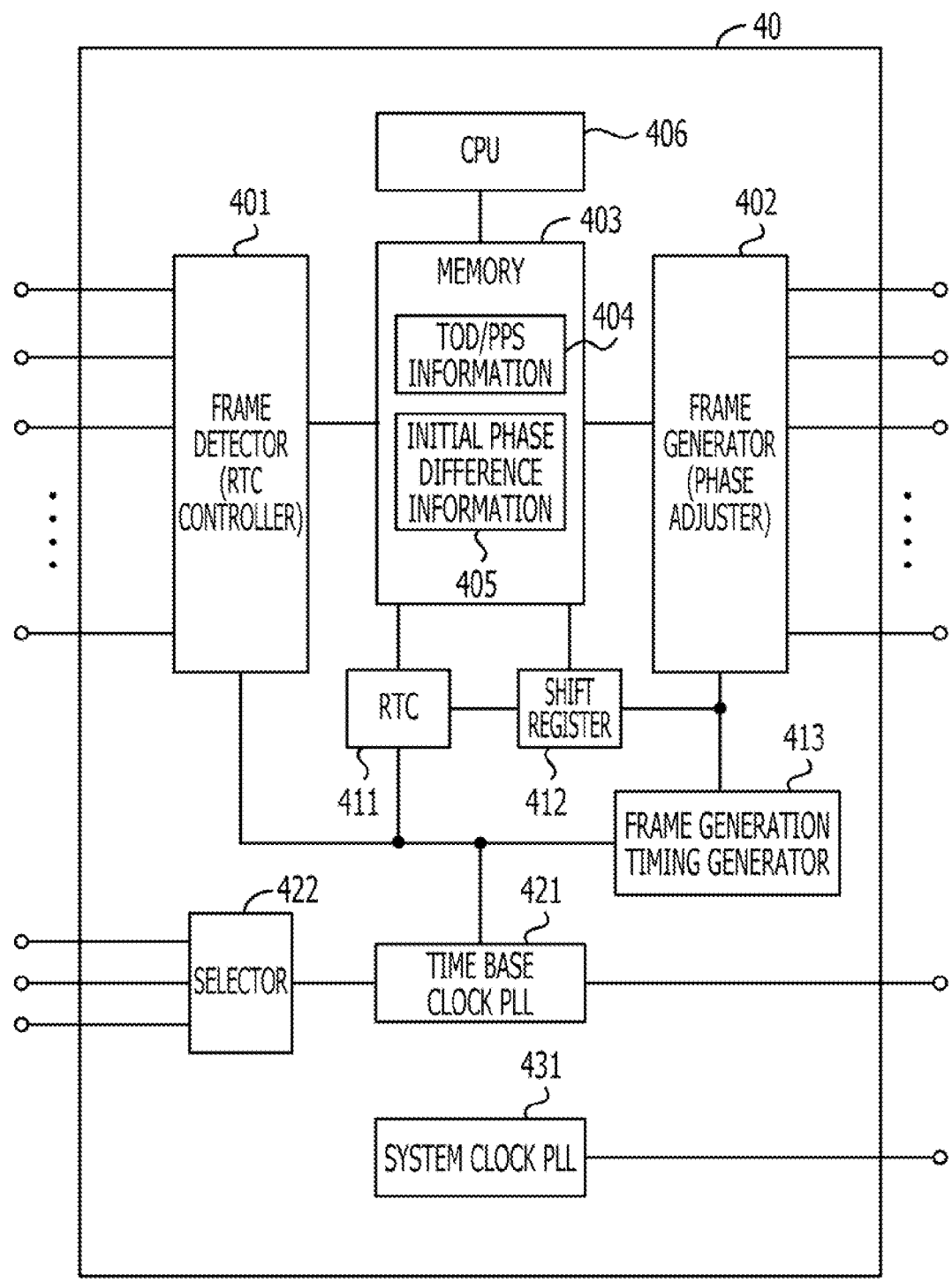
FIG. 4 illustrates a configuration of an MCU board.

A configuration of the MCU board 40 will be described with reference to FIG. 4. FIG. 4 is a block diagram illustrating a configuration of the MCU board 40.

As illustrated in FIG. 4, the MCU board 40 includes a frame detector 401, a frame generator 402, a memory 403, a CPU 406, an RTC 411, a shift register 412, a frame generation timing generator 413, a time base clock PLL 421, a selector 422, and a system clock PLL 431.

The frame detector 401 detects TOD/PPS information frames 90 sent by the interface board 10. The frame detector 401 stores in the memory 403 various types of information included in the received TOD/PPS information frame 90 as TOD/PPS information 404.

The frame generator 402 generates a TOD/PPS information frame 90 that includes TOD/PPS information 404 stored in the memory 403 in synchronization with the timing generated by the frame generation timing generator 413. The frame generator 402 sends the generated TOD/PPS information frame 90 to the interface board 10 in synchronization with the timing generated by the frame generation timing generator 413.

The memory 403 stores various types of information included in the TOD/PPS information frame 90 received from the frame detector 401, as TOD/PPS information 404. Additionally, the memory 403 stores initial phase difference information 405 that indicates an initial phase difference amount to be used by the shift register 133 when the interface boards 10 start operating. The initial phase difference amount is information, for example, that combines a transmission delay in the transmission path between the interface boards 10 and the MCU board 40, and a transmission delay in the transmission path up to the phase comparator 134 in each interface board 10.

Additionally, the memory 403 may store temporary parameters used in the operations of the CPU 406. Furthermore, the memory 403 stores software (for example, programs and the data used by such programs) and the like for operating the CPU 406.

The CPU 406 executes software in the MCU board 40.

The RTC 411 outputs clock data (for example, year, month, day, time, minute, second, and the like) and the like. The RTC 411 of the MCU board 40 preferably operates according to TOD and the like indicated by the TOD/PPS information 404 stored in the memory 403.

The shift register 412 outputs PPS that has been shifted only by the phase amount indicated by the shift bit information indicated in the TOD/PPS information 404 stored in the memory 403, to the RTC 411 in synchronization with the timing generated by the frame generation timing generator 413.

The frame generation timing generator 413 generates a timing when the frame generator 402 generates a TOD/information frame (in other words, a timing when the frame generator 402 sends a TOD/information frame). The frame generation timing generator 413 sends the generated timing to the frame generator 402 and the shift register 412.

The time base clock PLL 421 generates a time base clock by using any one line recovered clock among multiple line recovered clocks sent by interface boards 10. The time base clock PLL 421 sends the generated time base clock to the frame detector 401, the RTC 411, and the frame generation timing generator 413, as well as to the interface boards 10.

The system clock PLL 431 generates a system clock. The system clock PLL 431 sends the generated system clock to the SerDes 121 of each interface board 10 as a line reference clock.

(2) Operation Explanation

Operations of the communication system 1 of the present embodiment will be described with reference to FIGS. 5 to 13. The following explanation will focus on the synchronization operations of the communication system 1 of the present embodiment to simplify the explanation. The communication system 1 of the present embodiment may also conduct normal operations (for example, packet transmission operations and the like) in addition to the synchronization operations described hereinbelow.

(2-1) Master Mode Interface Board Operations

Figure 5:
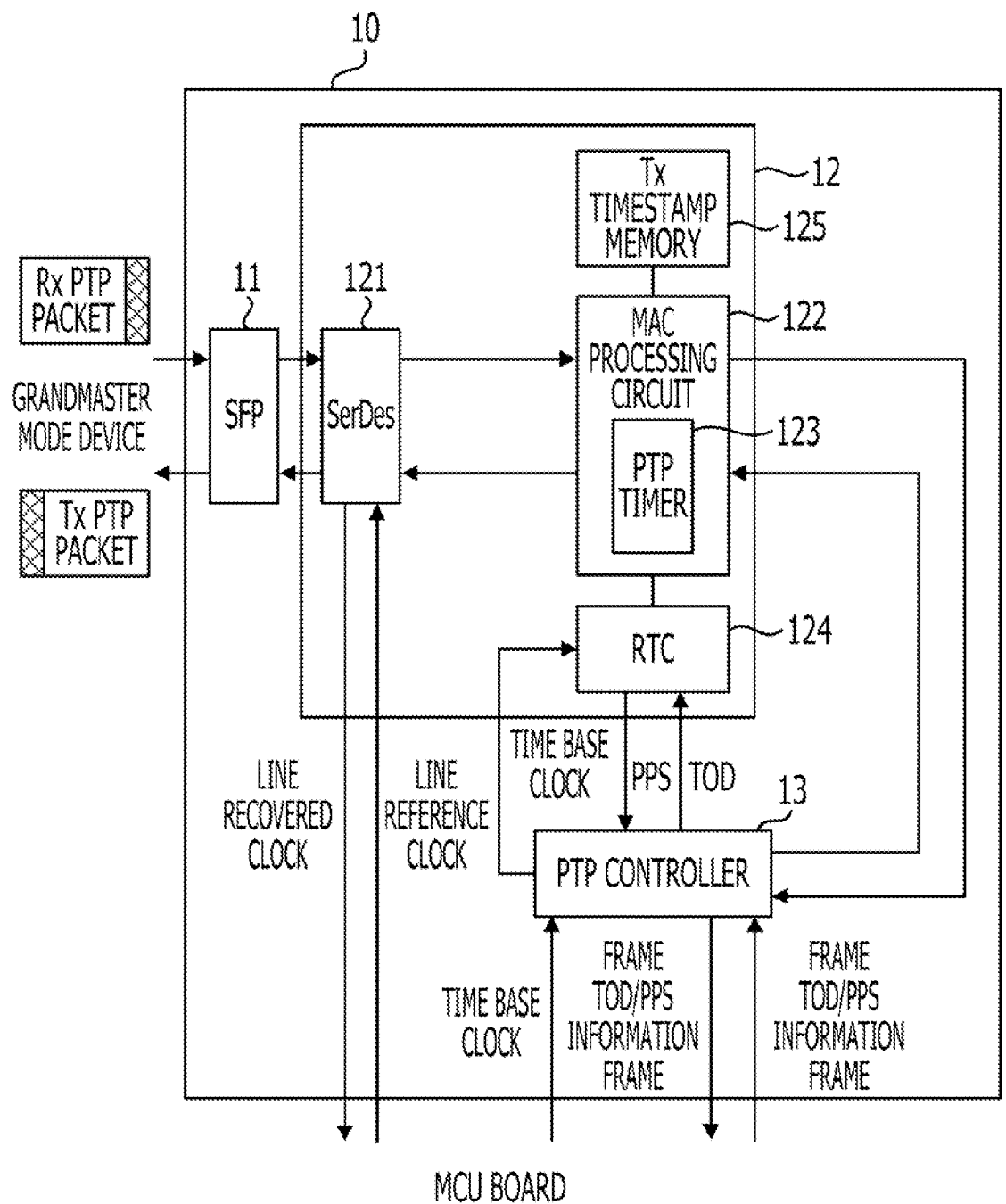
FIG. 5 illustrates the flow of signals inside the interface board when operating as the master mode interface board.
Figure 6:
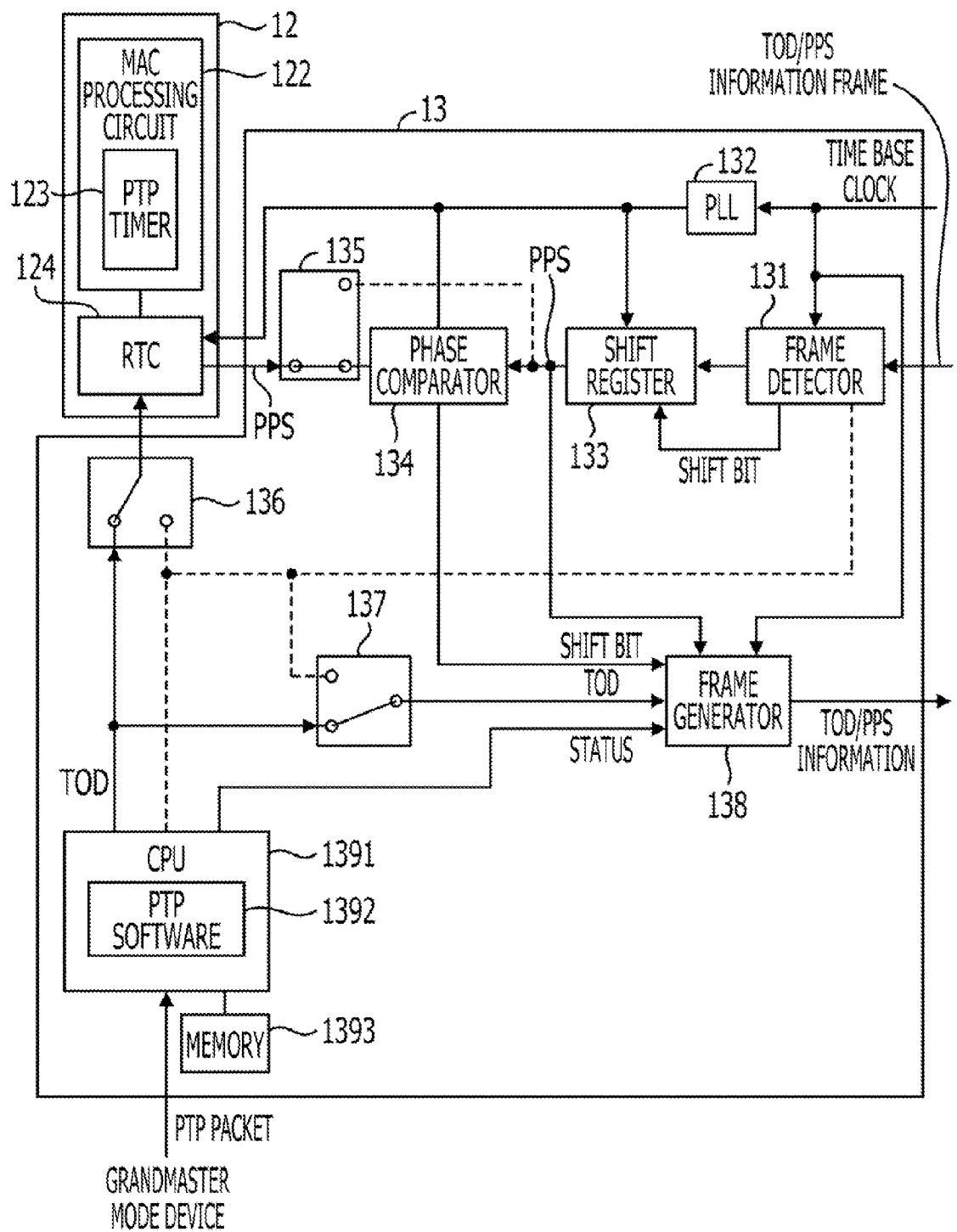
FIG. 6 illustrates the flow of signals inside the PTP controller when the master mode interface board is operating.
Figure 7:
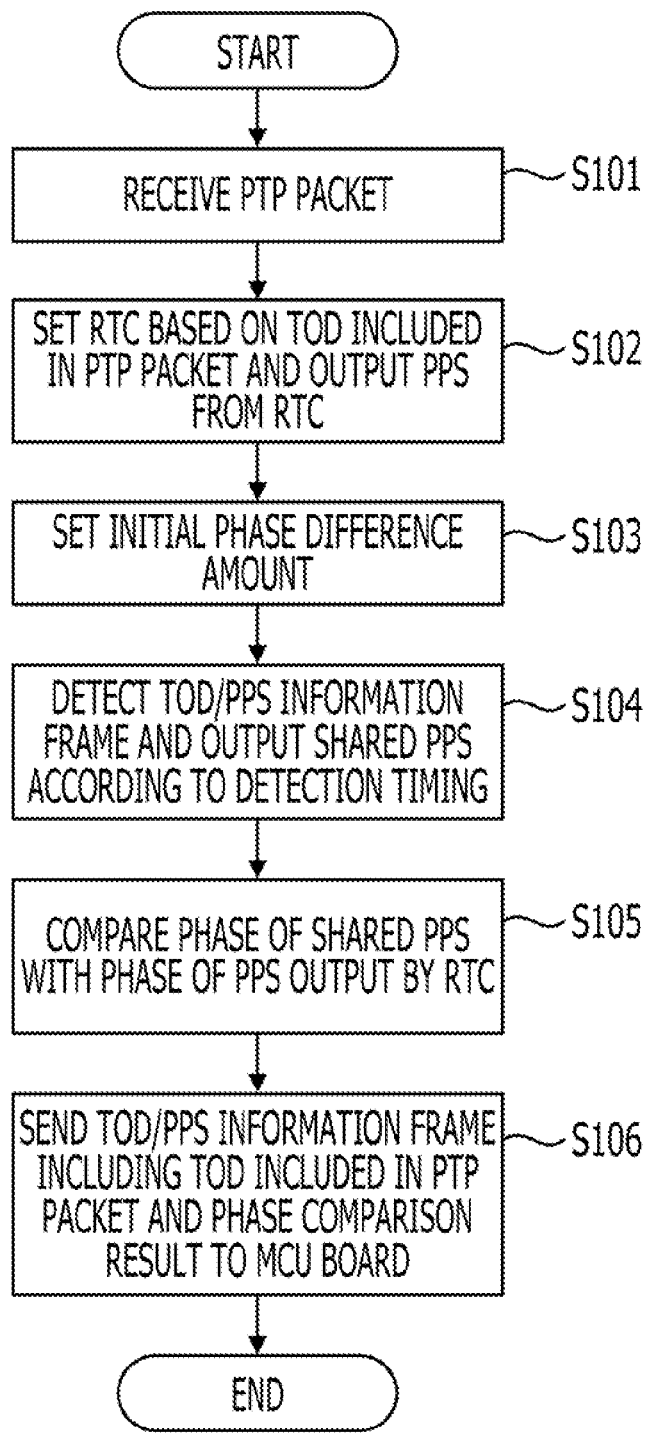
FIG. 7 illustrates an operation flow of the master mode interface board.

Operations of the master mode interface board 10 will be explained with reference to FIGS. 5 to 7. FIG. 5 is a block diagram illustrating the flow of signals inside the interface board 10 when operating as the master mode interface board. FIG. 6 is a block diagram illustrating the flow of signals inside the PTP controller 13 when the master mode interface board 10 is operating. FIG. 7 illustrates an operating method for the master mode interface board 10.

As illustrated in FIG. 7, the master mode interface board 10 receives a PTP packet (operation S101 in FIG. 7). Specifically, as illustrated in FIG. 5, the SFP 11 receives a PTP packet (Rx PTP packet) sent by the grandmaster-mode device through an optical input/output port. The SFP 11 outputs the received PTP packet to the MAC processing circuit 122 through the SerDes 121. The MAC processing circuit 122 conducts certain reception processing on the received PTP packet and outputs the reception-processed PTP packet to the PTP controller 13.

In addition, the SerDes 121 generates a line recovered clock synchronized with the PTP packet receiving timing by using a line reference clock (system clock) outputted by the MCU board 40 as a reference signal. The SerDes 121 outputs the generated line recovered clock to the MCU board 40.

The master mode interface board 10 may send, upon receiving the PTP packet, a notifying PTP packet (Tx PTP packet) to notify the grandmaster-mode device that the PTP packet was received. Specifically, the PTP controller 13 outputs the notifying PTP packet indicating that the PTP packet was received, to the MAC processing circuit 122. The MAC processing circuit 122 conducts certain transmission processing on the PTP packets outputted from the PTP controller 13 and outputs the transmission-processed PTP packets to the SFP 11 through the SerDes 121. Then, the SFP 11 sends the PTP packets to the grandmaster-mode device. At this time, the MAC processing circuit 122 stores in the Tx time stamp memory 125 the time the PTP packet was received identified by the operation of the PTP timer 123 included in the MAC processing circuit 122, and notifies the grandmaster-mode device of that time.

Then, the master mode interface board 10 sets in the RTC 124 the TOD included in the PTP packet (operation S102) as illustrated in FIG. 7. Specifically, the PTP software 1392 included in the PTP controller 13 (1) analyzes the received PTP packet, (2) obtains the TOD from the result of the analysis, and (3) outputs the obtained TOD to the RTC 124 through the selector 136, as illustrated in FIG. 6. Therefore, the selector 136 connects the CPU 1391 with the RTC 124. As a result, the RTC 124 can set the time information to the precision of the TOD included in the PTP packet. In other words, the RTC 124 synchronizes the time to the precision of the TOD included in the PTP packet.

The PTP software 1392 may output the obtained TOD to the frame generator 138 through the selector 137. Therefore, the selector 137 may connect the CPU 1391 with the frame generator 138. Additionally, the PTP software 1392 may output status information indicating a time synchronization status on the interface boards 10 to the frame generator 138.

Then, the RTC 124 begins the operation to synchronize to the time base clock outputted by the MCU board 40. Accordingly, the time base clock outputted by the MCU board 40 may be sent to the RTC 124 through the PLL 132. As a result, the RTC 124 outputs the PPS (operation S102) as illustrated in FIG. 7. Specifically, the RTC 124 outputs the PPS synchronized with a less than one microsecond level of delay to the grandmaster-mode device time as illustrated in FIG. 6. The PPS outputted by the RTC 124 is outputted to the phase comparator through the selector 135. Therefore, the selector 135 connects the RTC 124 with the phase comparator 134.

In the present embodiment, preferably no other processing unit that may cause such a transmission delay to the PPS as to influence the precise operations (for example, operations that maintain a precision with a delay lower than microseconds) is interposed between the RTC 124 and the phase comparator 134. Specifically, preferably no other processing unit that may cause a transmission delay of one or more microseconds to the PPS is interposed between the RTC 124 and the phase comparator 134. Alternatively, another processing unit may not be interposed between the RTC 124 and the phase comparator 134. Alternatively, no other processing unit other than the selector 135 may be interposed between the RTC 124 and the phase comparator 134. According to this configuration, the phase comparison by the phase comparator 134 can be conducted while maintaining the time precision of the PPS outputted by the RTC 124.

Next, the master mode interface board 10 obtains the initial phase difference amount sent from the MCU board 40 and sets the initial phase difference amount as an initial setting value of the shift register 133 (operation S103) as illustrated in FIG. 7. The master mode interface board 10 may not necessarily conduct the operations related to the initial phase difference amount. In this case, the MCU board 40 may not necessarily send the initial phase difference amount to the master mode interface board 10 and may not necessarily store the initial phase difference information 405 in the memory 403.

Next, the master mode interface board 10 detects the TOD/PPS information frame 90 sent by the MCU board 40 and outputs the shared PPS according to the timing of the detection of the TOD/PPS information frame 90 (operation S104) as illustrated in FIG. 7. Specifically, the frame detector 131 detects the TOD/PPS information frame 90 sent by the MCU board 40 as illustrated in FIG. 6. The frame detector 131 preferably operates in synchronization with the time base clock outputted by the MCU board 40 at this time. The frame detector 131 outputs the shared PPS according to the timing of the detection of the TOD/PPS information frame 90, to the shift register 133.

Next, the shift register 133 shifts the phase of the shared PPS corresponding to the timing of the detection of the TOD/PPS information frame 90, only by the initial phase difference amount. The shift register 133 preferably operates in synchronization with the time base clock outputted by the MCU board 40 at this time. Therefore, the time base clock outputted by the MCU board 40 is preferably sent to the shift register 133 through the PLL 132. Next, the shift register 133 outputs the shifted shared PPS to the phase comparator 134 as illustrated in FIG. 6.

Next, the master mode interface board 10 compares the phase of the shared PPS outputted by the shift register 133 with the phase of the PPS outputted by the RTC 124 (operation S105) as illustrated in FIG. 7. The comparison is conducted by the phase comparator 134. In the present embodiment, the phase comparator 134 compares the phase of the shared PPS outputted by the shift register 133 with the phase of the PPS outputted by the RTC 124 at a precision (for example, at a precision with a less than one microsecond level of delay) corresponding to the resolution performance of the RTC 124. Specifically, in the present embodiment, the phase comparator 134 compares the phase of the shared PPS outputted by the shift register 133 with the phase of the PPS outputted by the RTC 124 at a precision of the high frequency clock outputted by the PLL 132. Therefore, the PLL 132 preferably generates a high frequency clock having a precision with a less than one microsecond of delay by frequency-dividing the time base clock, and outputs the high frequency clock to the phase comparator 134.

Next, the phase comparator 134 outputs the comparison result (for example, a phase difference amount) to the frame generator 138 as shift bit information as illustrated in FIG. 6.

Next, the master mode interface board 10 sends the TOD/PPS information frame 90 including the TOD included in the PTP packet and the phase comparison result from the phase comparator 134 and the like, to the MCU board 40 (operation S106) as illustrated in FIG. 7. Specifically, the frame generator 138 generates the TOD/PPS information frame 90 including the TOD (that is, the TOD included in the PTP packet) and the status information outputted by the PTP software 1392, and the shift bit information (that is, phase comparison result) outputted by the phase comparator 134, as illustrated in FIG. 6. Next, the frame generator 138 sends the generated TOD/PPS information frame 90 to the MCU board 40. The frame generator 138 preferably operates in synchronization with the time base clock outputted by the MCU board 40 at this time.

A frame configuration of the TOD/PPS information frame 90 will be explained with reference to FIGS. 8A to 8C.

Figure 8C:
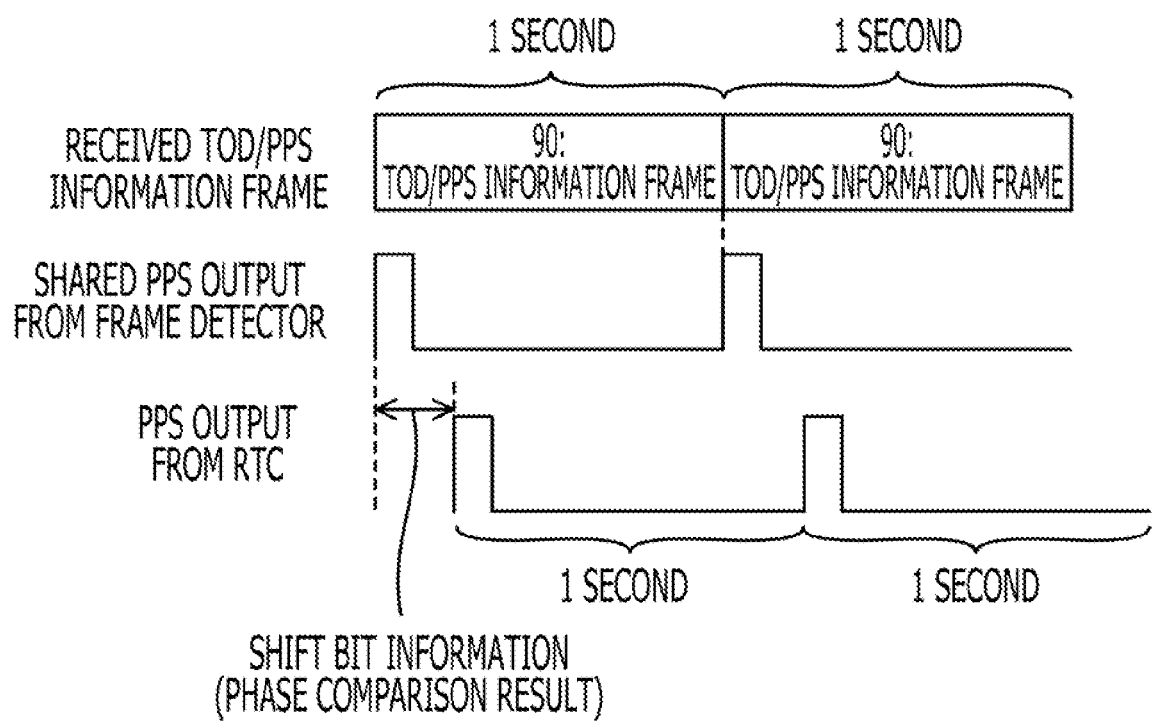

FIGS. 8A, 8B, and 8C are data configuration diagrams illustrating the frame configuration of the TOD/PPS information frame 90.

The TOD/PPS information frame 90 includes a framing field, a mode field, a synchronization status field, a synchronization control field, a TOD field, a shift bit field, and a reserved field as illustrated in FIGS. 8A and 8B.

The framing field stores fixed values that are unique to the TOD/PPS information frame 90 and that are referred to during the framing processing.

The mode field stores mode information that indicates whether the TOD/PPS information frame 90 was sent between the master mode interface board 10 and the MCU board 40, or between the slave mode interface board 10 and the MCU board 40. For example, when the mode information is "0", the mode information indicates that the TOD/PPS information frame 90 is transmitted between the master mode interface board 10 and the MCU board 40. For example, when the mode information is "1", the mode information indicates that the TOD/PPS information frame 90 is transmitted between the slave mode interface board 10 and the MCU board 40.

The synchronization status field stores status information indicating a synchronization status. For example, when the status information is "00", the status information indicates that use of the TOD/PPS information frame 90 for synchronization is prohibited. For example, when the status information is "01", the status information indicates that synchronization using the TOD/PPS information frame 90 is currently being conducted. For example, when the status information is "10", the status information indicates that synchronization using the TOD/PPS information frame 90 is completed.

The synchronization control field stores control information for controlling the synchronization operations. For example, when the control information is "00", the control information indicates that the TOD/PPS information frame 90 is not requesting any type of action. For example, when the control information is "01", the control information indicates that the TOD/PPS information frame 90 indicates the current set shift bit amount to the shift register 133. For example, when the control information is "10", the control information indicates that the MCU board 40 requests the interface board

10 to cause the TOD/PPS information frame 90 to notify the MCU board 40 of the current shift bit amount set in the shift register 133. For example, when the control information is "11", the control information indicates that the TOD/PPS information frame 90 requests the interface board 10 to use the shift bit information included in the TOD/PPS information frame 90 in the shift register 133.

The TOD field stores the TOD included in the PTP packet. However, as explained below, the TOD field may be used to store the TOD included in the TOD/PPS information frame 90 TOD field detected by the frame detector 131 in the slave mode interface board 10.

The shift bit field stores shift bit information outputted by the phase comparator 134. However, as explained below, the shift bit field may not necessarily be used to store shift bit information in the slave mode interface board 10.

The reserved field is a field set aside for storing future functions.

FIG. 8C illustrates the shared PPS obtained by detecting the TOD/PPS information frame 90. As illustrated in FIG. 8C, each time the TOD/PPS information frame 90 is received, the frame detector 131 outputs the shared PPS corresponding to the timing of reception to the shift register 133. On the other hand, PPS information is also outputted by the RTC 124. The phase comparator 134 compares the phases of the two types of PPS and outputs the result (shift bit information) thereof to the frame generator 138.

(2-2) MCU Board Operations

Figure 9:
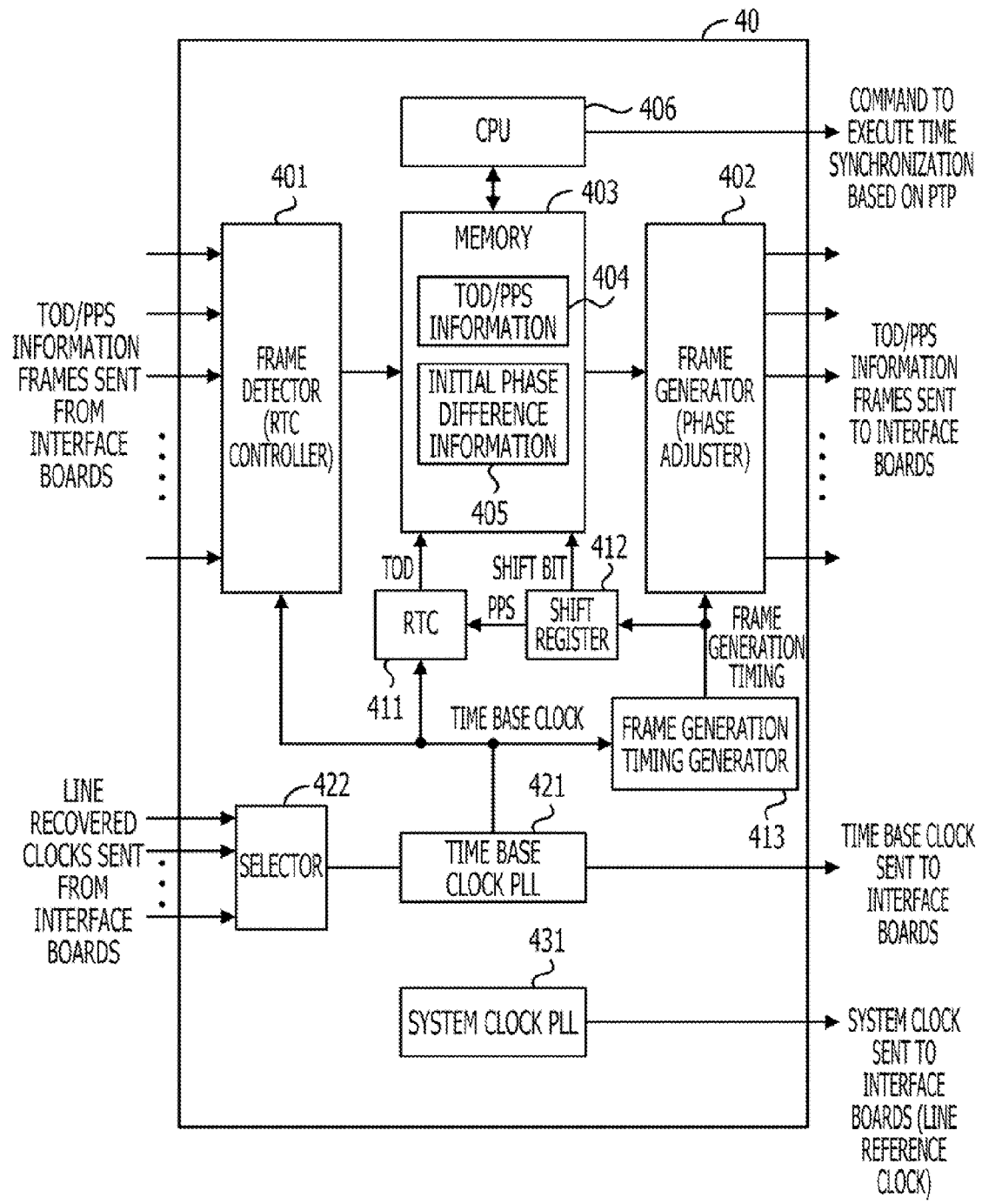
FIG. 9 illustrates the flow of signals inside the MCU board.
Figure 10:
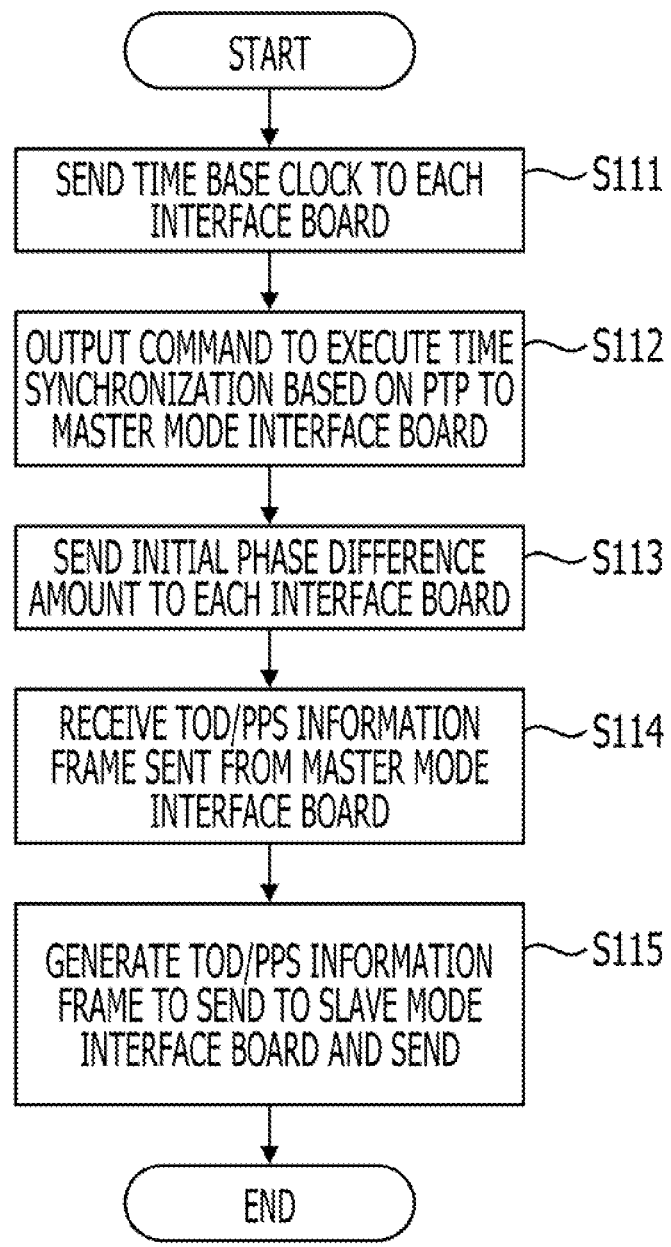
FIG. 10 illustrates an operation flow of the MCU board.

Operations of the MCU board 40 will be described with reference to FIGS. 9 and 10. FIG. 9 is a block diagram illustrating the flow of signals inside the MCU board 40. FIG. 10 illustrates an operating method for the MCU board 40.

As illustrated in FIG. 10, the MCU board 40 generates a time base clock and sends the generated time base clock to each interface board 10 (operation S111). Specifically, as illustrated in FIG. 9, the time base clock PLL 421 generates a time base clock and sends the generated time base clock to each interface board 10. The time base clock PLL 421 may use any one of the line recovered clocks sent from the interface boards 10 as a reference signal. For example, the time base clock PLL 421 may use, as a reference signal, the most accurate line recovered clock of the line recovered clocks sent from the interface boards 10. The selection of the line recovered clock is conducted by the selector 422.

The time base clock generated by the time base clock PLL 421 is also outputted to the frame detector 401, the RTC 411, and the frame generation timing generator 413. As a result, the frame detector 401, the RTC 411, and the frame generation timing generator 413 each operate in synchronization with the time base clock.

Next, as illustrated in FIG. 10, the MCU board 40 outputs to the master mode interface board 10 a command to execute time synchronization based on the PTP protocol (operation S112). In other words, the MCU board 40 receives the PTP packet from the grandmaster-mode device and outputs a command to the master mode interface board 10 to set the time based on the received PTP packet. The outputting of this command may also be conducted by the CPU 406.

Next, as illustrated in FIG. 10, the MCU board 40 sends the initial phase difference amount to each interface board 10 (operation S113). Specifically, the frame generator 402 obtains the initial phase difference amount by referring to the initial phase difference information 405 stored in the memory 403 as illustrated in FIG. 9. Then, the frame generator 402 generates a TOD/PPS information frame 90 containing the initial phase difference amount in the shift bit field. Next, the frame generator 402 sends the generated TOD/PPS information frame 90 to each interface board 10.

The frame generator 402 may generate the TOD/PPS information frame 90 at the frame generation timing generated by the frame generation timing generator 413 based on the time base clock. Hence, the generation and sending of the TOD/PPS information frame 90 by the MCU board 40 may occur at the frame generation timing. Therefore, the TOD/PPS information frame 90 detection, the phase comparison, and the TOD/PPS information frame 90 generation and sending are may be conducted at the frame generation timing in the master mode interface board 10 that conducts the phase comparison after receiving the TOD/PPS information frame 90. Similarly, the TOD/PPS information frame 90 detection and time synchronization may be conducted at the frame generation timing in the slave mode interface board 10 that conducts time synchronization after receiving the TOD/PPS information frame 90. That is, the interface boards 10 of the present embodiment conduct time synchronization at the frame generation timing generated by the MCU board 40. The frame generation timing generated by the frame generation timing generator 413 is outputted to the shift register 412. Therefore, the shift register 412 operates in synchronization with the frame generation timing.

Next, the MCU board 40 receives the TOD/PPS information frame 90 sent by the master mode interface board 10 as illustrated in FIG. 10 (operation S114). Specifically, the frame detector 401 detects the TOD/PPS information frame 90 sent by the master mode interface board 10 as illustrated in FIG. 9. Next, the frame detector 401 stores in the memory 403 various types of information included in the received TOD/PPS information frame 90 as TOD/PPS information 404.

The shift register 412 outputs to the RTC 411 the PPS generated by shifting the phase at the frame generation timing by the phase amount indicated by the shift bit information indicated in the TOD/PPS information 404 stored in the memory 403. Additionally, the TOD indicated by the TOD/PPS information 404 stored in the memory 403 is outputted to the RTC 411. As a result, the TOD indicated by the TOD/PPS information 404 stored in the memory 403 and the PPS outputted by the shift register 412 are set in the RTC 411.

Next, the MCU board 40 generates a TOD/PPS information frame 90 to be sent to the slave mode interface board 10 and sends the generated TOD/PPS information frame 90 to the slave mode interface board 10 as illustrated in FIG. 10 (operation S115). Specifically, the frame generator 402 generates a TOD/PPS information frame 90 that includes the TOD/PPS information 404 stored in the memory 403 as illustrated in FIG. 9. Next, the frame generator 402 sends the generated TOD/PPS information frame 90 to the slave mode interface board 10.

(2-3) Slave Mode Interface Board Operations

Figure 11:
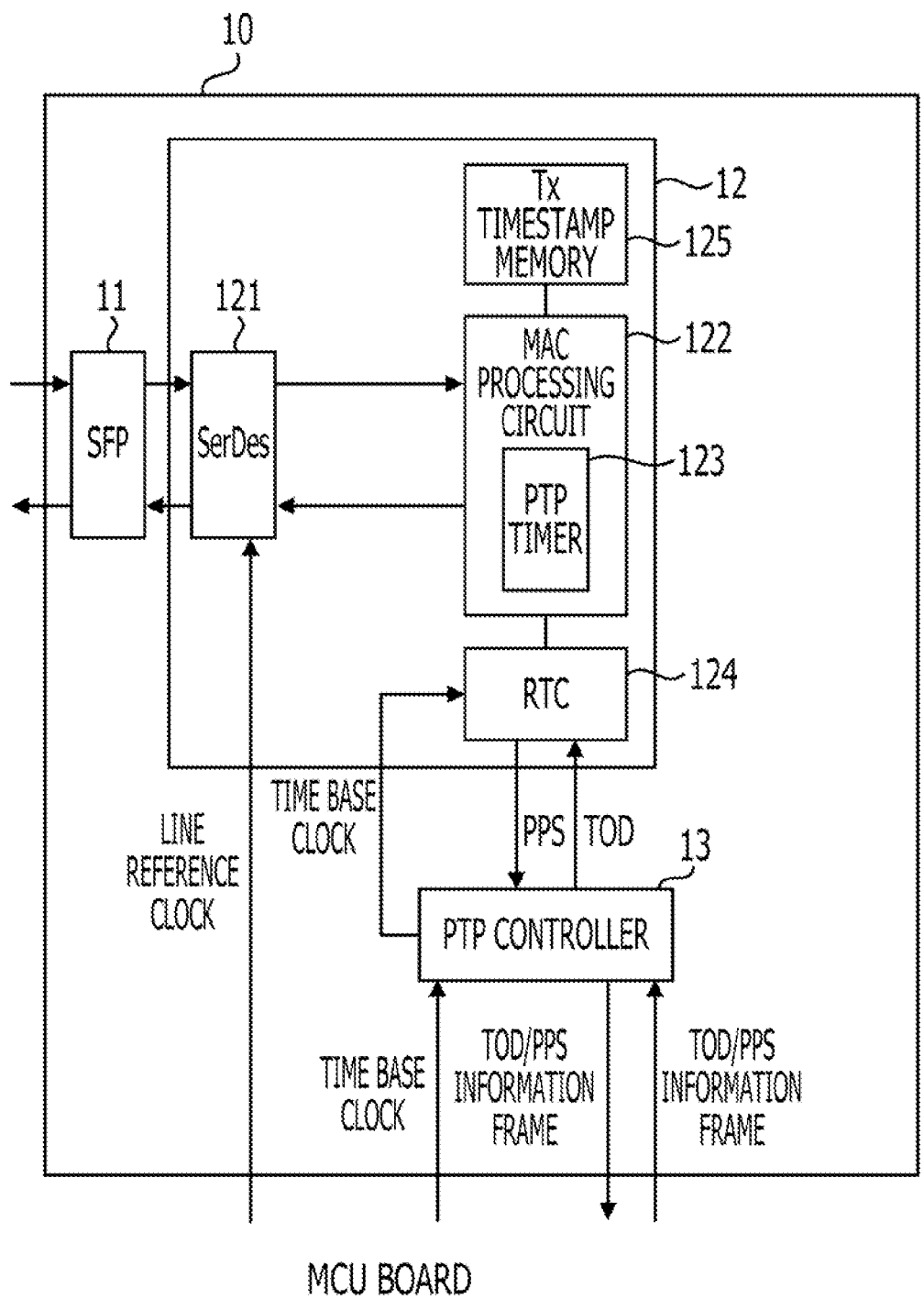
FIG. 11 illustrates the flow of signals inside the interface board when operating as the slave mode interface board.
Figure 12:
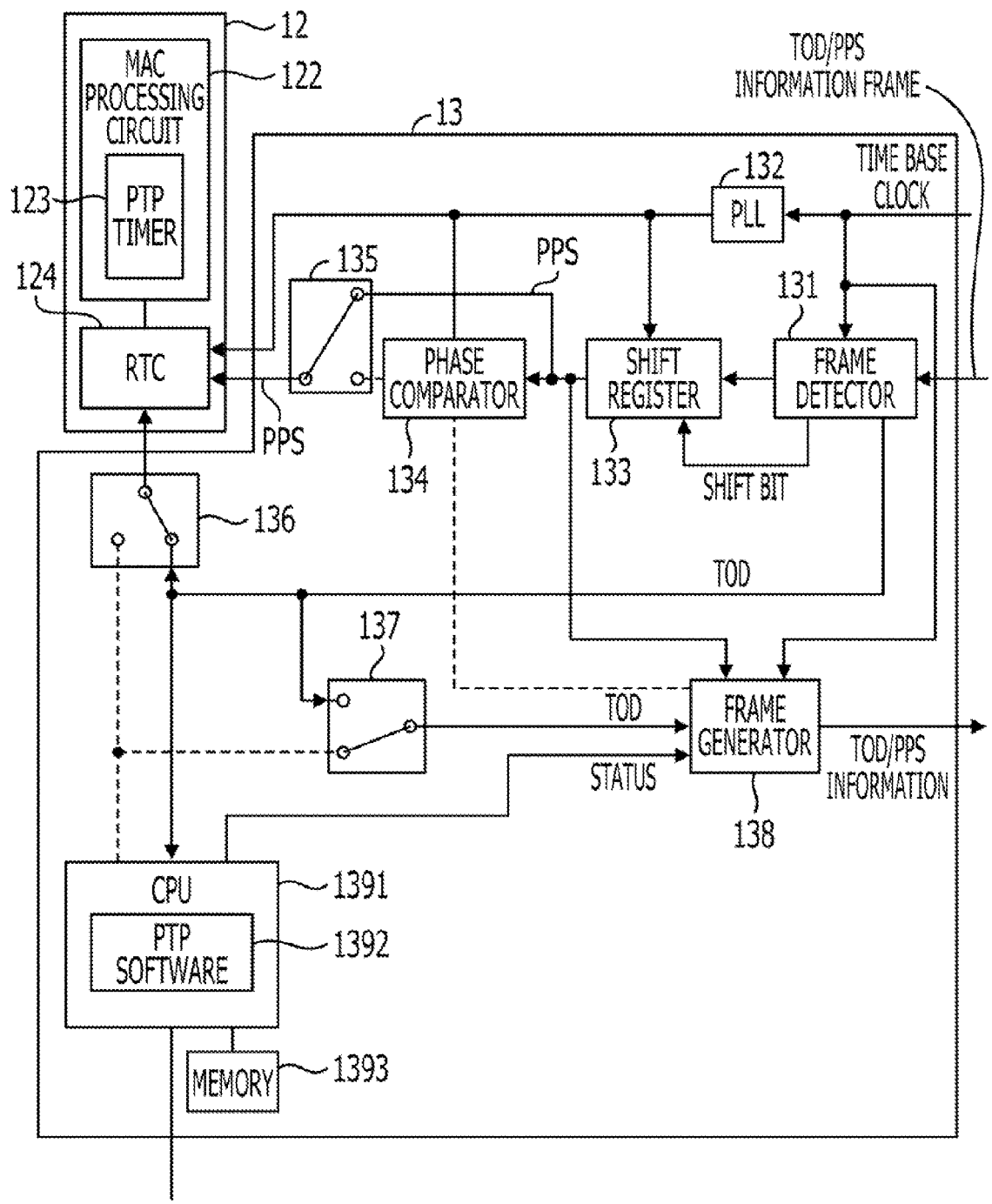
FIG. 12 illustrates the flow of signals inside the PTP controller when the slave mode interface board is operating.
Figure 13:
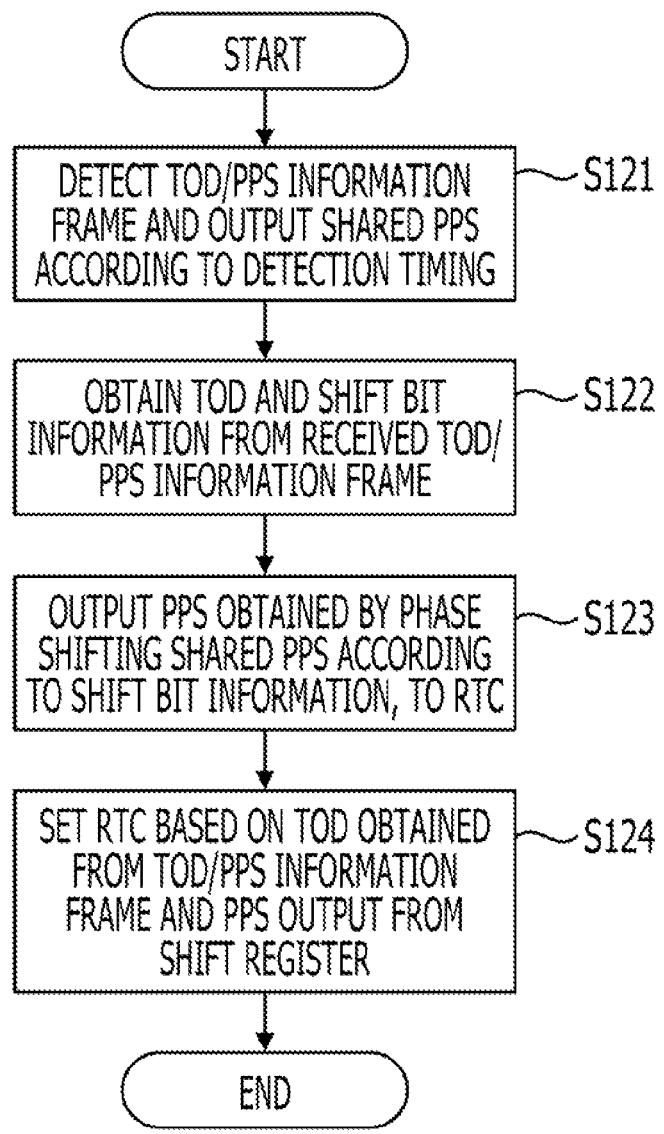
FIG. 13 illustrates an operation flow of the slave mode interface board.

Operations of the slave mode interface board 10 will be explained with reference to FIGS. 11 to 13. FIG. 11 is a block diagram illustrating the flow of signals inside the interface board 10 when operating as the slave mode interface board. FIG. 12 is a block diagram illustrating the flow of signals inside the PTP controller 13 when the slave mode interface board 10 is operating. FIG. 13 is a flow chart illustrating the operations of the slave mode interface board 10.

The slave mode interface board 10 is not coupled to the grandmaster-mode device as illustrated in FIG. 11. As a result, the slave mode interface board 10 may not necessarily send and receive PTP packets. Additionally, the SerDes 121 in the slave mode interface board 10 may not necessarily output the line recovered clock. However, the SerDes 121 may generate a line recovered clock synchronized with the receiving timing of packets other than PTP packets.

The slave mode interface board 10 detects the TOD/PPS information frame 90 sent by the MCU board 40 and outputs the shared PPS according to the timing of the detection of the TOD/PPS information frame 90 (operation S121) as illustrated in FIG. 13. Specifically, the frame detector 131 detects the TOD/PPS information frame 90 sent by the MCU board 40 as illustrated in FIG. 12. The frame detector 131 outputs the shared PPS according to the timing of the detection of the TOD/PPS information frame 90, to the shift register 133.

Next, the slave mode interface board 10 obtains the TOD and shift bit information included in the received TOD/PPS information frame 90 as illustrated in FIG. 13 (operation S122). Specifically, the frame detector 131 obtains the TOD stored in the TOD field in the received TOD/PPS information frame 90 as illustrated in FIG. 12. The frame detector 131 outputs the obtained TOD to the RTC 124 through the selector 136. Therefore, the selector 136 connects the frame detector 131 and the RTC 124. Additionally, the frame detector 131 outputs the obtained TOD to the frame generator 138 through the selector 137. Therefore, the selector 137 connects the frame detector 131 and the frame generator 138. Similarly, the frame detector 131 obtains the shift bit information stored in the shift bit field in the received TOD/PPS information frame 90. The frame detector 131 outputs the obtained shift bit information to the shift register 133.

Next, the slave mode interface board 10 outputs the shared PPS to the RTC 124 after shifting the phase outputted by the frame detector 131 by the shift phase amount indicated in the shift bit information outputted by the frame detector 131 as illustrated in FIG. 13 (operation S123). Specifically, the shift register 133 shifts the phase of the shared PPS outputted by the frame detector 131 by the phase amount indicated in the shift bit information outputted by the frame detector 131 as illustrated in FIG. 12. Next, the shift register 133 outputs the shifted PPS to the RTC 124 through the selector 135. Therefore, the selector 135 connects the shift register 133 and the RTC 124.

As a result, the TOD obtained from the TOD/PPS information frame 90 and the PPS outputted by the shift register 133 are set in the RTC 124 as illustrated in FIG. 13 (operation S124). That is, the RTC 124 starts operations at the same time as the master mode interface board 10. That is, the setting of the time information is conducted at the precision of the TOD included in the PTP packet in the RTC 124 in the slave mode interface board 10 in the same way as in the RTC 124 in the master mode interface board 10. That is, the time synchronization is conducted at the precision of the TOD included in the PTP packet in the RTC 124 in the slave mode interface board 10 in the same way as in the RTC 124 in the master mode interface board 10.

The slave mode interface board 10 may or may not necessarily send the TOD/PPS information frame 90 including the TOD and the like included in the received TOD/PPS information frame 90 to the MCU board 40. The shift bit information may not necessarily be included in the sent TOD/PPS information frame 90 since the comparison of the phase of the PPT outputted by the RTC 124 and the phase of the shared PPT is not conducted in the slave mode interface board 10.

As described above, time synchronization in the slave mode interface board 10 is conducted according to the shift bit information (phase comparison result) outputted by the master mode interface board 10 in the communication system 1 of the present embodiment. Therefore, even when the communication system 1 has a plurality of interface boards 10, the setting of the times (synchronization) of each of the interface boards 10 can be carried out as desired based on the time of one grandmaster-mode device.

The precision with a less than microsecond level of delay may be compromised due to PPS transfer delay or waveform deterioration and the like when the slave mode interface board 10 is notified with the PPS of the master mode interface board 10 itself. However, quantification of the synchronization state (for example, PPS state) in the master mode interface board 10 can be conducted according to the communication system 1 of the present embodiment. That is, the synchronization state of the master mode interface board 10 can be sent to the slave mode interface board 10 as quantitative values of shift bit information. Therefore, the time synchronization of the slave mode interface board 10 can be conducted without losing the precision of the time synchronization of the master mode interface board 10.

The comparison of the phases in the master mode interface board 10 can be conducted at a precision of a high frequency clock corresponding to the resolution performance of the RTC 124 according to the communication system 1 of the present embodiment. Therefore, the PPS phase difference can be quantified without losing the time precision with a less than microsecond of delay conducted by the master mode interface board 10 based on the PTP protocol. As a result, the slave mode interface board 10 can set the time without losing the time precision with a less than microsecond delay.

All the configuration elements in the interface board 10 operate in synchronization with a time base clock sent by the MCU board 40 and shared throughout the communication system according to the communication system 1 of the present embodiment. As a result, the influence of frequency variation on the phase comparison result can be removed as opposed to the case where the time base clocks are set individually (for example, by providing individual oscillators) in each interface board 10.

A time base clock with a frequency lower than a high frequency clock can be sent from the MCU board 40 to the interface boards 10 instead of directly sending the abovementioned high frequency clock according to the communication system 1 of the present embodiment. In this case, the interface boards can generate a high frequency clock by frequency-dividing the time base clock. As a result, the influence of high frequency clock transfer delays and waveform deterioration caused when sending the high frequency clock from the MCU board 40 to the interface boards 10 can be removed.

Communication can be conducted between each interface board 10 and the MCU board 40 using a frame signal such as the TOD/PPS information frame 90 according to the communication system 1 of the present embodiment. As a result, the interface boards 10 and the MCU board 40 can send and receive information such as TOD using one signal line and without implementing processing using software.

The initial phase difference amount can be set by the shift register 133 in the communication system 1 of the present embodiment. As a result, the interface boards 10 can conduct time setting with high precision by taking into account the transfer delay between the interface boards 10 and the MCU board 40.

The status information (for example, synchronization status information, synchronization control information, etc.) of each of the interface boards 10 can be collected in the MCU board 40 according to the communication system 1 of the present embodiment. As a result, the functions of the interface boards 10 can be simplified since integrated control by the MCU board 40 is made possible.

Sending and receiving of the TOD/PPS information frames 90 and comparison of the PPS phases (that is, setting and synchronizing the times) can be conducted at a frame generation timing generated by the frame generation timing generator 413 according to the communication system 1 of the present embodiment. As a result, setting and synchronizing the times can be conducted at suitable frequency taking into account the load on the communication system 1 by appropriately changing the frame generation timing.

The time base clock can be generated by using the line recovered clock corresponding to the PTP packet receiving timing as a reference signal according to the communication system 1 of the present embodiment. As a result, frequency drift between the interface boards 10 and the grandmaster-mode device (or the time source such as a GPS satellite coupled to the grandmaster-mode device) can be suppressed.

The abovementioned description is based on the example of comparing the phase of the PPS. That is, PPS is used as an example of a "synchronization signal" in the above description. However, the above result can be achieved by adopting the same operations even when any synchronization signal format other than PPS is used for comparing phases. That is, the abovementioned result can be achieved through synchronization in the slave mode interface boards 10 based on the result of comparing a synchronization signal (specifically, for example, a signal parameter of a synchronization signal phase or frequency and the like) used by the master mode interface board 10 and any shared synchronization signal (specifically, for example, a signal parameter of a synchronization signal phase or frequency and the like) sent by the MCU board 40.

In the above description, multiple interface boards conducting optical communication were illustrated using a mounted transmission device with multiple slots intercoupled through a back wiring board, as an example of a communication system. However, in addition to a communication system 1 having multiple interface boards 10 conducting optical communication, similar effects can be achieved using similar configurations with interface boards conducting other types of communication (for example, wireless communication or electrical communication and the like) or with any communication system having multiple communication systems. For example, a communication system having multiple wireless base stations can enjoy the various effects described above by conducting the abovementioned operations between master mode and slave mode wireless base stations among multiple wireless base stations.

(3) Modifications

A configuration of a communication system 1 of the present embodiment will be described with reference to FIGS. 14 to 19.

(3-1) First Modification

A communication system 1a of the first modification will be illustrated with reference to FIGS. 14 and 15. The operations and configuration of an MCU board 40a in the communication system 1a of the first modification is different compared to the abovementioned communication system 1. Conversely, other configuration elements of the communication system 1a of the first modification are the same as those of the abovementioned communication system 1. Therefore, the following explanation will focus on the configuration and operations of the MCU board 40a that differ from those of the communication system 1 to simplify the explanation. Configuration elements that are the same as those of the abovementioned communication system 1 are provided with the same reference numerals and detailed explanations thereof will be omitted.

(3-1-1) Configuration

A configuration of the MCU board 40a according to the first modification will be described with reference to FIG. 14. FIG. 14 is a block diagram illustrating a configuration of the MCU board 40a.

Figure 14:
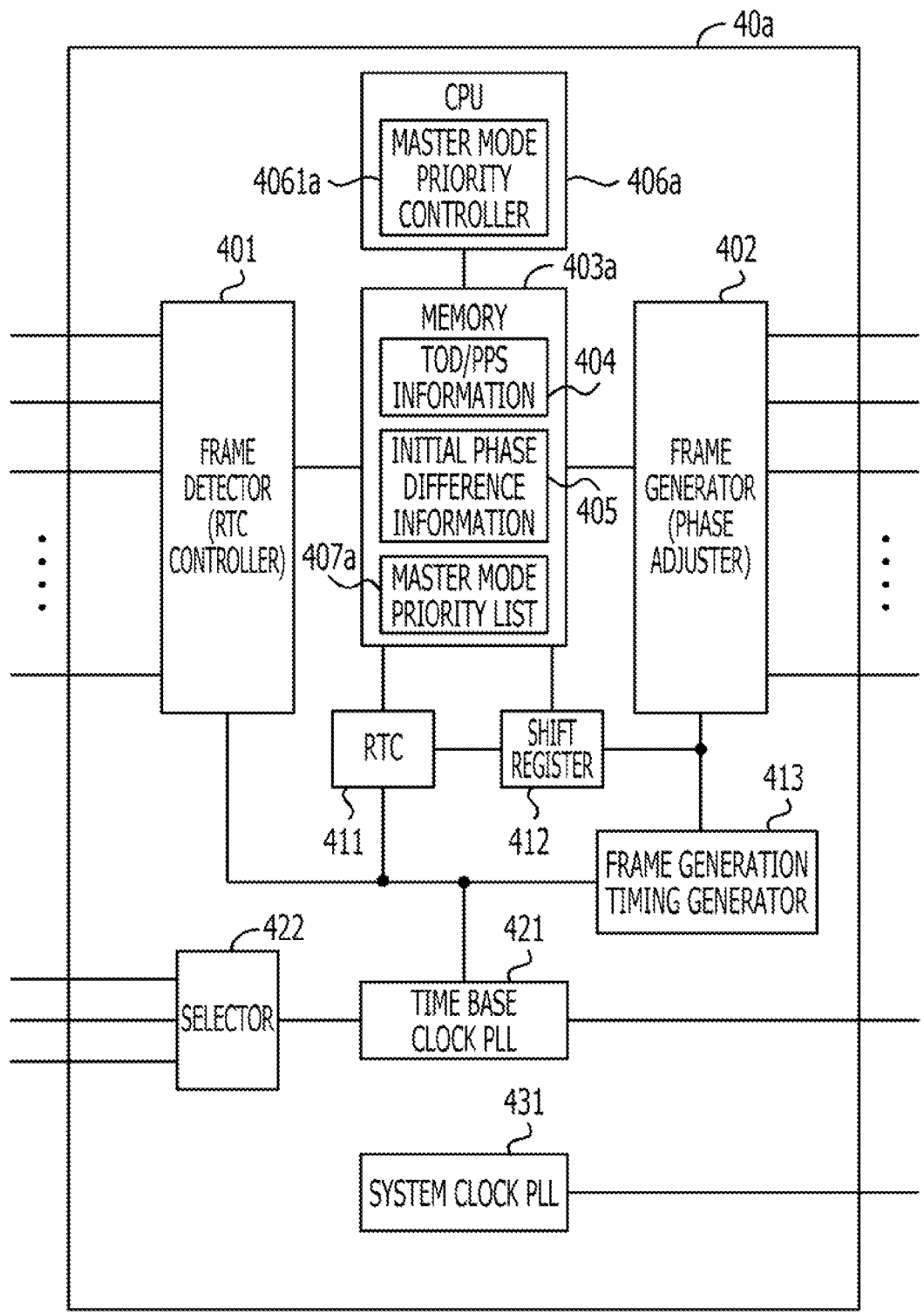
FIG. 14 illustrates a configuration of an MCU board of a first modification.

As illustrated in FIG. 14, the MCU board 40a of the first modification includes a frame detector 401, a frame generator 402, a memory 403a, a CPU 406a, an RTC 411, a shift register 412, a frame generation timing generator 413, a time base clock PLL 421, a selector 422, and a system clock PLL 431, in the same way as the abovementioned MCU board 40. The memory 403a and the CPU 406a of the MCU board 40a according to the first modification differ from those of the abovementioned MCU board 40.

The memory 403a stores a master mode priority list 407a in addition to the abovementioned TOD/PPS information 404 and the initial phase difference information 405. The master mode priority list 407a indicates priority among multiple interface boards 10 that operate as master mode devices if the communication system 1a includes multiple interface boards 10 that can operate as master mode devices.

The CPU 406a conducts software processing in the MCU board 40a. The CPU 406a includes a master mode priority controller 4061a as an example of a "selecting unit." The master mode priority controller 4061a selects one interface board 10 to actually operate as a master mode device among the multiple interface boards 10 that can operate as master mode devices, based on the master mode priority list 407a. That is, the master mode priority controller 4061a selects one interface board 10 to actually conduct sending and receiving of the PTP packets with the grandmaster-mode device and also send the TOD/PPS information that includes the phase comparison and shift bit information, from the multiple interface boards 10 that can operate as master mode devices, based on the master mode priority list 407a.

(3-1-2) Operations

Operations of the MCU board 40a according to the first modification will be described with reference to FIG. 15. FIG. 15 is a sequence diagram illustrating the flow of operations of the MCU board 40a according to the first modification. FIG. 15 focuses on particular operations (that is, operations when multiple interface boards 10 that can operate as master mode devices exist) of the MCU board 40a according to the first modification. However, the MCU board 40a of the first modification may also conduct operations (that is, operations illustrated in FIG. 10) that are similar to those of the abovementioned MCU board 40.

Figure 15:
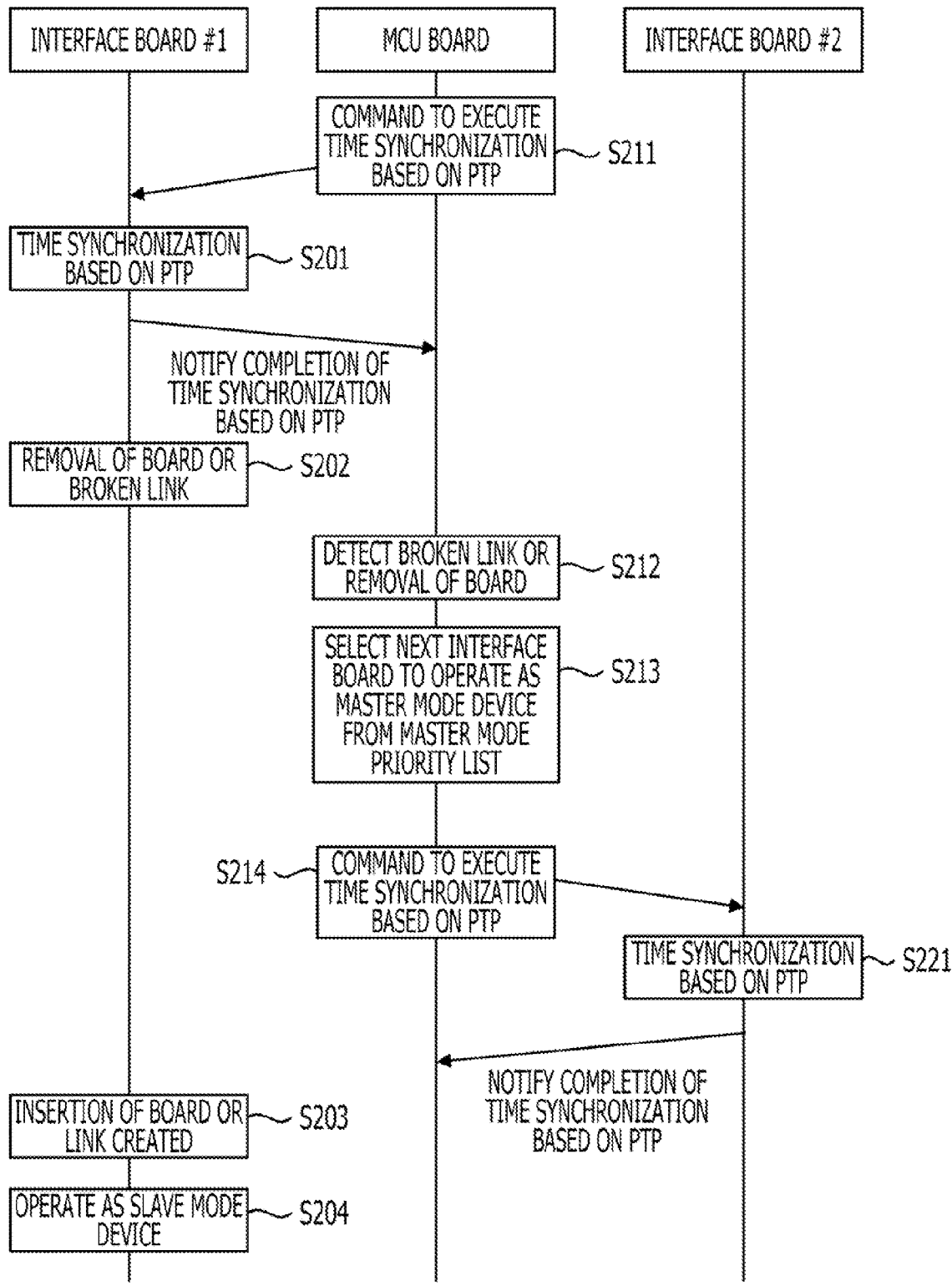
FIG. 15 illustrates a flow of operations of an MCU board of the first modification.

As illustrated in FIG. 15, the master mode priority controller 4061a included in the MCU board 40a outputs a command, based the PTP protocol, to execute time synchronization of the master mode interface board 10 with the highest priority by referring to the master mode priority list 407a (operation S211). Specifically, the master mode priority controller 4061a selects one interface board 10 to actually operate as a master mode device from the multiple interface boards 10 that can operate as master mode devices, by referring to the master mode priority list 407a. In this case, an interface board 10 #1 is selected as the one interface board 10 to operate as the master mode device. Next, the CPU 406a outputs a command to execute time synchronization based on the PTP to the selected interface board 10 #1.

As a result, the selected interface board 10 #1 conducts time synchronization based on the PTP (operation S201). That is, the selected interface board 10 #1 receives a PTP packet from the grandmaster-mode device and sets the time based on the received PTP packet (operation S201). The operation S201 is the same as operation S101 and operation S102 in FIG. 7. The selected interface board 10 #1 notifies the MCU board 40a that the time synchronization based on the PTP is completed after completing the time synchronization based on the PTP.

Next, a case where normal communication between the interface board 10 #1 and the MCU board 40a cannot be conducted, or where a state in which such communication might become disabled is assumed (operation S202). Examples of a state where normal communication between the interface board 10 #1 and the MCU board 40a cannot be conducted or might become disabled include a state where the interface board 10 #1 is removed, or where the interface board 10 #1 has damage in some way (for example, damage that disrupts or might disrupt normal communication).

In this case, the MCU board 40a detects the state in which normal communication between the interface board 10 #1 and the MCU board 40a cannot be conducted or might become disabled (operation S212). The CPU 406a may conduct the operation to detect such a state.

When the state in which normal communication between the interface board 10 #1 and the MCU board 40a cannot be conducted or might become disabled is detected, the master mode priority controller 4061a in the MCU board 40a selects the next interface board 10 to actually operate as the master mode device based on the master mode priority list 407a (operation S213). That is, the master mode priority controller 4061a selects the interface board 10 with the highest priority following the interface board 10 #1 that has fallen into the state in which normal communication cannot be conducted or might become disabled, from the multiple interface boards 10 that can operate as master mode devices, based on the master mode priority list 407a. In this case, an interface board 10 #2 is selected as the next interface board 10 to operate as the master mode device.

Next, the CPU 406a outputs a command to execute time synchronization based on the PTP to the selected interface board 10 #2 (operation S214).

As a result, the selected interface board 10 #2 conducts time synchronization based on the PTP protocol (operation S221). That is, the selected interface board 10 #2 receives a PTP packet from the grandmaster-mode device and sets the time based on the received PTP packet (operation S221). The operation S221 is the same as operation S101 and operation S102 in FIG. 7. The selected interface board 10 #2 notifies the MCU board 40a that the time synchronization based on the PTP is completed after completing the time synchronization based on the PTP. Thereafter, the interface board 10 #2 operates as the master mode interface board 10 in place of the interface board 10 #1.

If the interface board 10 #1 is re-inserted or if the problem that occurred in the interface board 10 #1 is resolved, the state in which normal communication between the interface board 10 #1 and the MCU board 40a cannot be conducted or might become disabled, can be resolved (operation S203). In this case, the interface board 10 #1 may operate as a slave mode interface board 10 (operation S204).

As described above, one interface board 10 can be selected to actually operate as a master mode device even when multiple interface boards 10 that can operate as master mode devices exist in the communication system 1a according to the first modification. Alternatively, respective multiple master mode interface boards 10 may individually conduct time synchronization based on the PTP packets sent by corresponding grandmaster-mode devices when multiple interface boards 10 actually operating as actual master mode devices exist. In this case, it may be difficult to say that the entire communication system 1 is synchronized with one shared base time. However, since one interface board 10 is selected to actually operate as the master mode device in the first modification, the entire communication system 1 can be synchronized to one base time.

According to the communication system of the first modification, one interface board 10 operating as a master mode device can be appropriately or automatically switched in order of the highest priority based on the master mode priority list 407a.

(3-2) Second Modification

Figure 16:
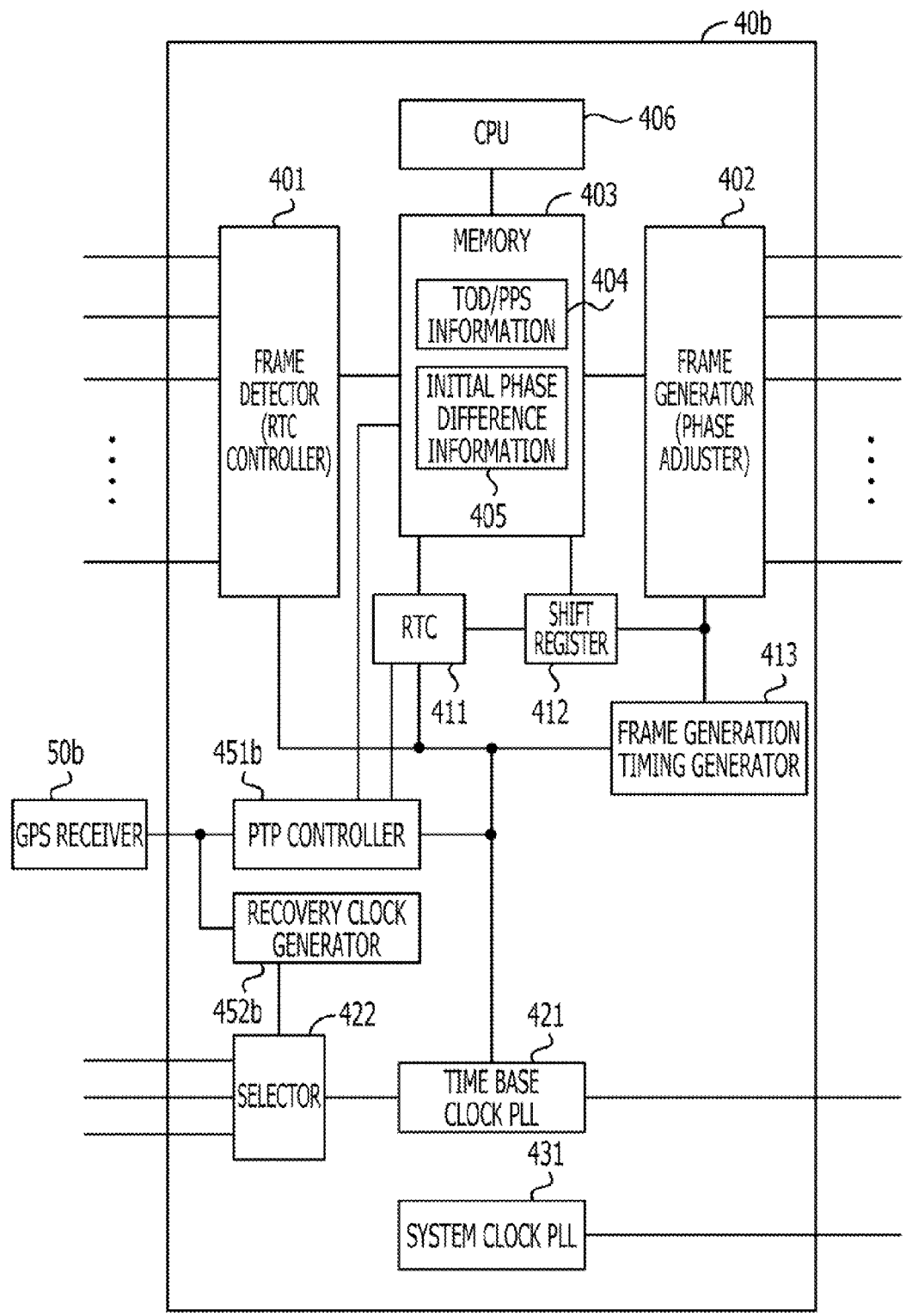
FIG. 16 illustrates a configuration of an MCU board of a second modification.
Figure 17:
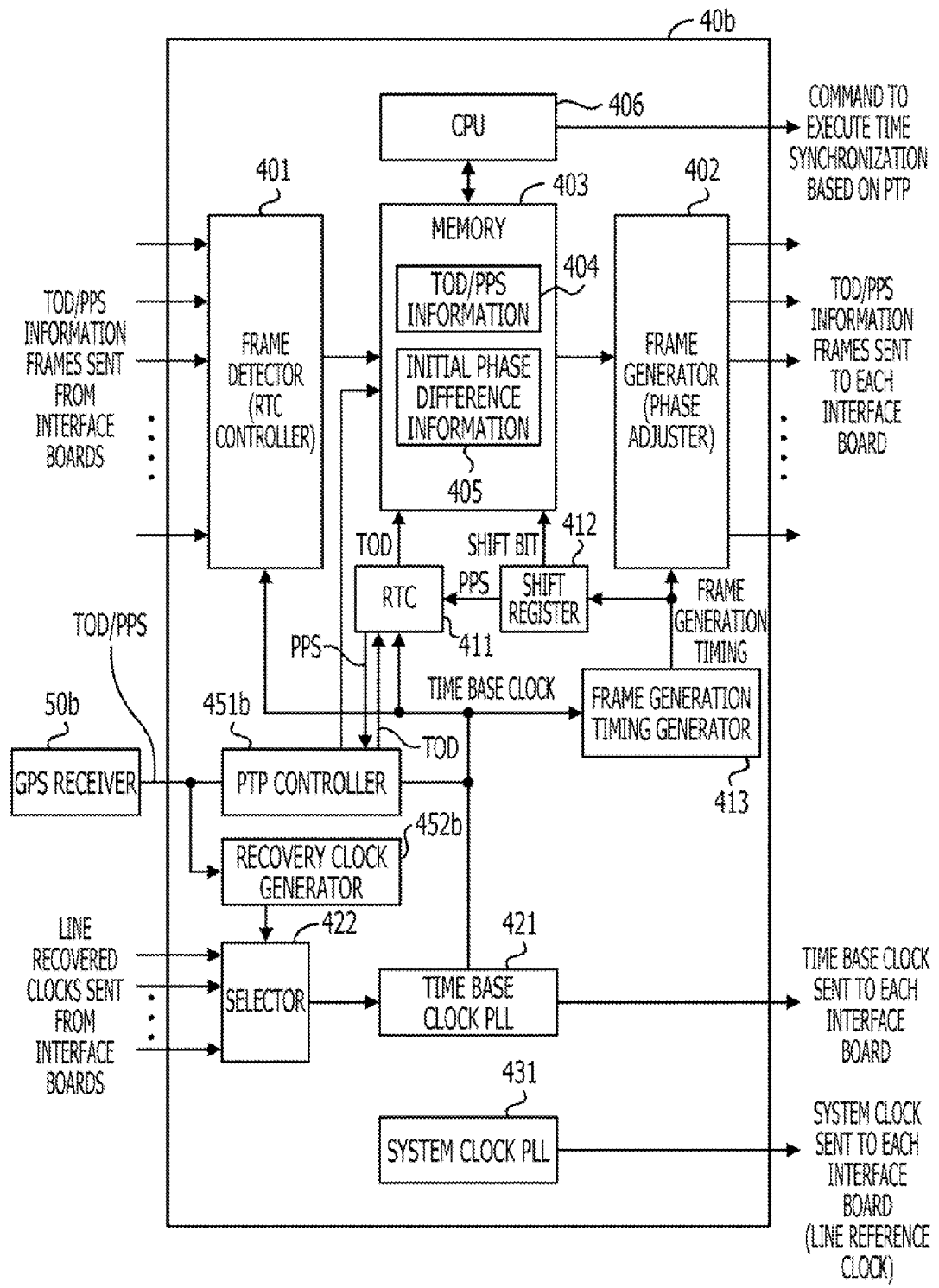
FIG. 17 illustrates the flow of signals inside the MCU board when the MCU board of the second modification is operating.

A communication system 1b according to a second modification will be described with reference to FIGS. 16 and 17. The operations and configuration of an MCU board 40b in the communication system 1b of the second modification differ from the abovementioned communication system 1. Conversely, other configuration elements of the communication system 1b of the second modification are the same as those of the abovementioned communication system 1. Therefore, the following explanation will focus on the configuration and operations of the MCU board 40b that differ from those of the communication system 1 to simplify the explanation. Configuration elements that are the same as those of the abovementioned communication system 1 are provided with the same reference numerals and detailed explanations thereof will be omitted. FIG. 16 is a block diagram illustrating a configuration of the MCU board 40b of the second modification. FIG. 17 is a block diagram illustrating the flow of signals in the MCU board 40b when the MCU board 40b of the second modification is operating.

As illustrated in FIGS. 16 and 17, the MCU board 40b of the second modification includes a frame detector 401, a frame generator 402, a memory 403, a CPU 406, an RTC 411, a shift register 412, a frame generation timing generator 413, a time base clock PLL 421, a selector 422, and a system clock PLL 431 in the same way as the abovementioned MCU board 40.

The MCU board 40b of the second modification further includes a PTP controller 451b and a recovery clock generator 452b.

The PTP controller 451b has the same configuration and conducts the same operations as the abovementioned PTP controller 13. Specifically, the PTP controller 451b obtains a GPS signal from a GPS receiver 50b provided inside or outside the MCU board 40b (or inside or outside the communication system 1b). The GPS receiver 50b receives GPS radio waves sent by a GPS satellite which is an example of a "master time source," and outputs the GPS signal that includes the GPS radio wave that indicates the TOD and the PPS.

The PTP controller 451b sets the RTC 411 based on the GPS signal in the same condition that the abovementioned PTP controller 13 sets the RTC 124 based on the PTP packet. Additionally, the PTP controller 451b compares the phase of the PPS outputted by the RTC 411 and the phase of the shared PPS (that is, the phase at the timing in which the MCU board 40b sends the TOD/PPS information frame 90). The comparison result is stored in the memory 403 as shift bit information (in other words, as TOD/PPS information that includes the shift bit information). Additionally, the PTP controller 451b stores the TOD included in the GPS signal in the memory 403 as TOD/PPS information 404.

The recovery clock generator 452b generates a line recovered clock synchronized with the timing of the reception of the GPS signal. The recovery clock generator 452b outputs the generated line recovered clock to the selector 422.

In this way, the MCU board 40b operates like the abovementioned master mode interface board 10 in the second modification. As a result, all interface boards 10 may operate as slave mode interface boards 10 in the second modification. All the abovementioned results can be desirably achieved with this type of configuration.

The explanation of the second modification describes the MCU board 40b obtaining the GPS signal including the TOD and the PPS and the like directly from the GPS receiver 50b. However, the MCU board 40b may also be configured to receive a PTP packet including the TOD and the PPS and the like from the abovementioned grandmaster-mode device. The abovementioned results can also be desirably achieved with this type of configuration.

(3-3) Third Modification

Figure 18:
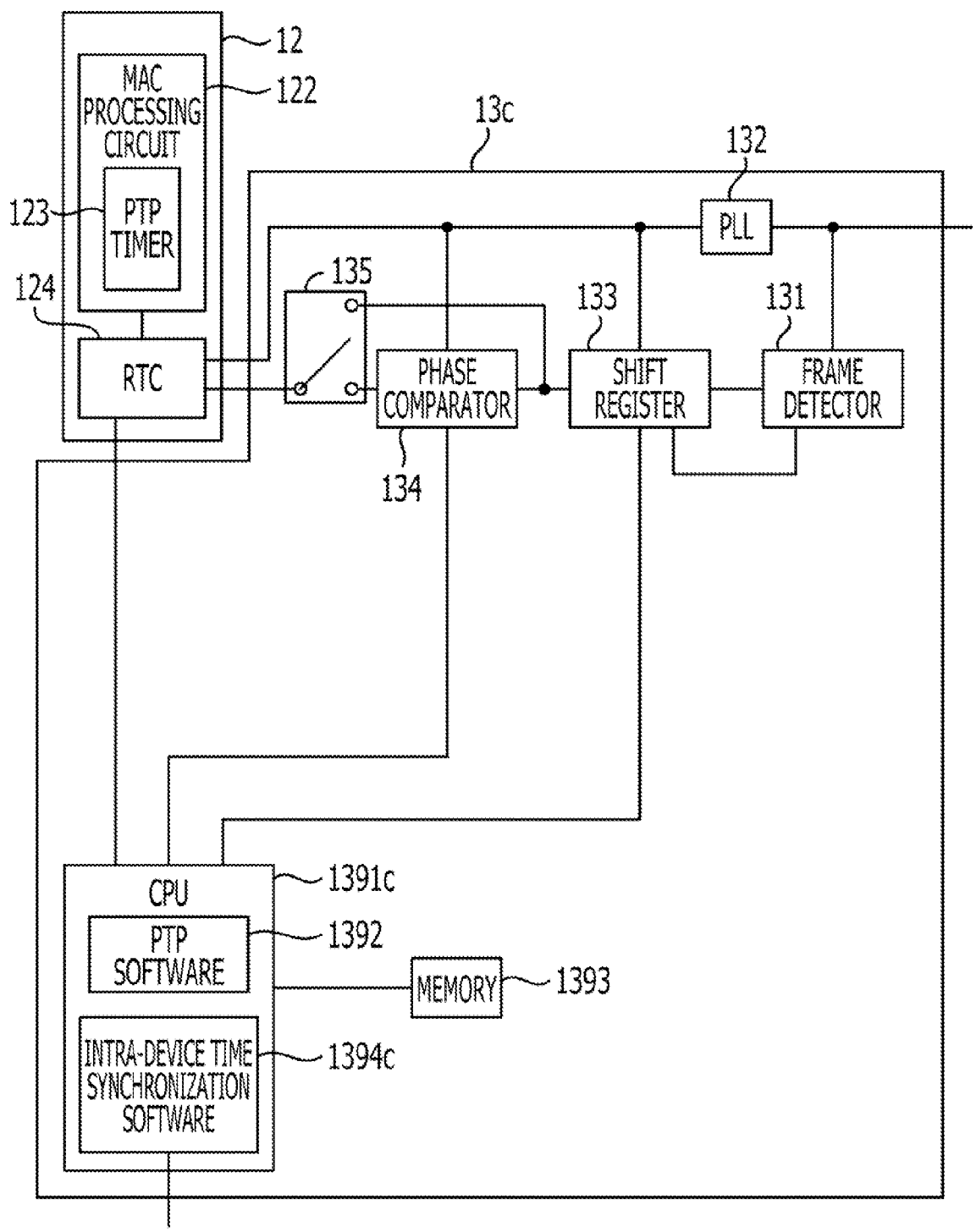
FIG. 18 illustrates a configuration of a PTP controller of a third modification.
Figure 19:
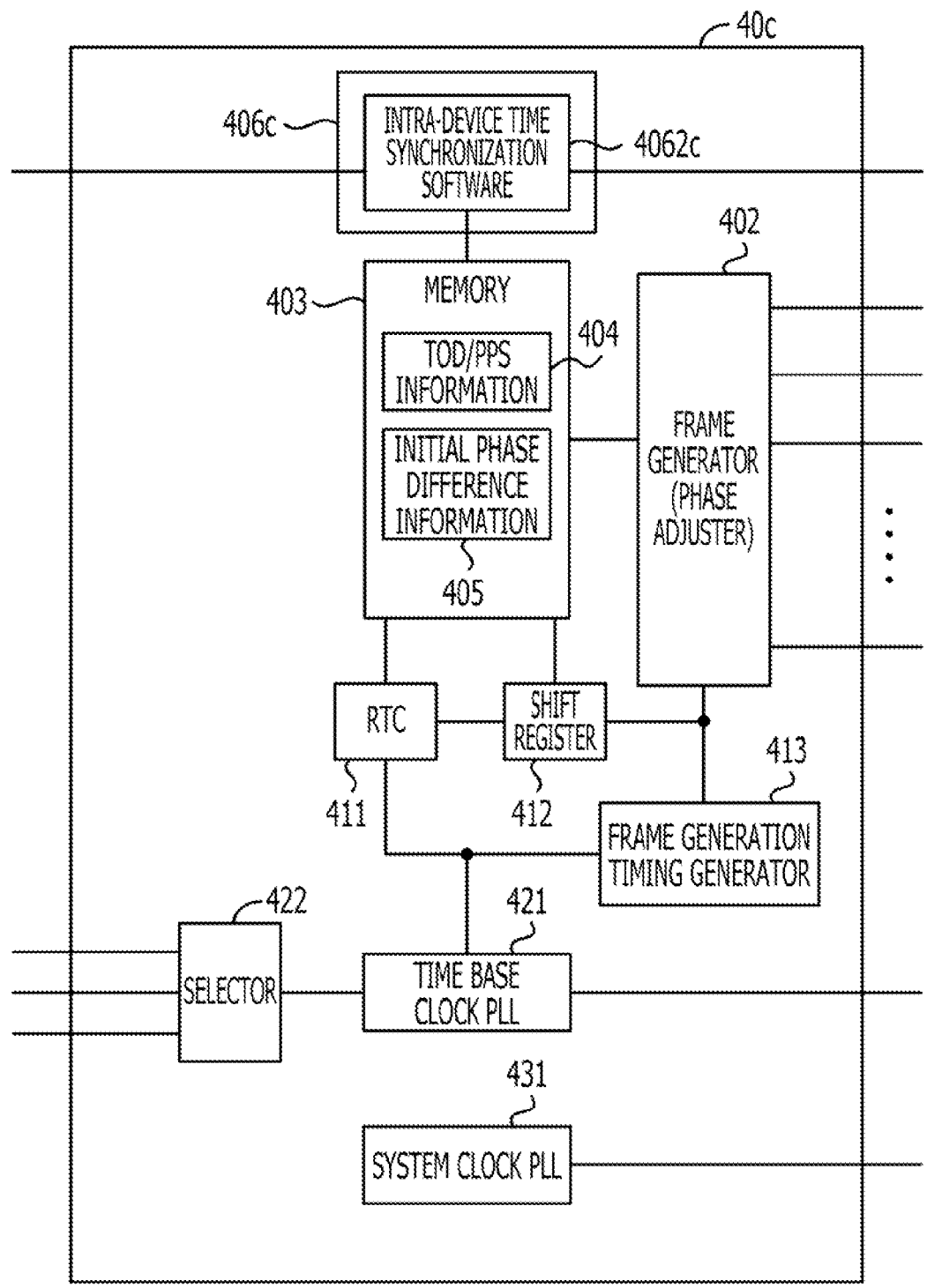
FIG. 19 illustrates a configuration of a MCU board of the third modification.

A communication system 1c of a third modification will be illustrated with reference to FIGS. 18 and 19. The operations and configurations of a PTP controller 13c included in the interface board 10 and an MCU board 40c in the communication system 1c of the third modification differ from those in the abovementioned communication system 1. Conversely, other configuration elements of the communication system 1c of the third modification are the same as those of the abovementioned communication system 1. Therefore, the following explanation will focus on the configuration and operations of the PTP controller 13c and the MCU board 40c that differ from those of the communication system 1 to simplify the explanation. Configuration elements that are the same as those of the abovementioned communication system 1 are provided with the same reference numerals and detailed explanation thereof will be omitted. FIG. 18 is a block diagram illustrating a configuration of the PTP controller 13c according to the third modification. FIG. 19 is a block diagram illustrating a configuration of the MCU board 40c according to the third modification.

As illustrated in FIG. 18, the PTP controller 13c of the third modification includes a frame detector 131, a PLL 132, a shift register 133, a phase comparator 134, a CPU 1391c, and a memory 1393, in the same way as the abovementioned PTP controller 13. Conversely, the PTP controller 13c of the third modification may not necessarily include the selector (switch) 136, the selector (switch) 137, or the frame generator 138 as opposed to the abovementioned PTP controller 13.

The CPU 1391c of the third modification includes intra-device time synchronization software 1394c in addition to the abovementioned PTP software 1392. The intra-device time synchronization software 1394c executes sending and receiving processing with the MCU board 40c of the information sent and received using the TOD/PPS information frame 90.

Specifically, the following operations are conducted in the third modification when the interface board 10 operates as a master mode device. The phase comparator 134 outputs the shift bit information to the CPU 1391 (specifically, to the intra-device time synchronization software 1394c). The PTP software 1392 executes processing to output the TOD obtained from the PTP packets to the intra-device time synchronization software 1394c. As a result, the intra-device time synchronization software 1394c sends data including the shift bit information and the TOD to the MCU board 40c by executing the software processing.

Similarly, the following operations are conducted in the third modification when the interface board 10 operates as a slave mode device. The data (specifically, the data including the TOD and shift bit information) sent by the MCU board 40c is received and processed by the intra-device time synchronization software 1394c. The intra-device time synchronization software 1394c executes the processing to output the TOD included in the received data to the RTC 124. Additionally, the intra-device time synchronization software 1394c conducts processing to output the shift bit information included in the received data to the shift register 133.

As illustrated in FIG. 19, the MCU board 40c of the third modification includes a frame generator 402, a memory 403, a CPU 406c, an RTC 411, a shift register 412, a frame generation timing generator 413, a time base clock PLL 421, a selector 422, and a system clock PLL 431, in the same way as the abovementioned MCU board 40. Conversely, the MCU board 40c of the third modification may not necessarily include the frame detector 401 contrary to the abovementioned MCU board 40.

The CPU 406c of the third modification includes intra-device time synchronization software 4062c. The intra-device time synchronization software 4062c executes sending and receiving processing of the information sent and received with the interface board 10 according to the software processing using the TOD/PPS information frame 90 in the same way as the abovementioned intra-device time synchronization software 1394c.

The sending and receiving of the shared PPS information between the MCU board 40c and the slave mode interface board 10 is also preferred in the third modification. As a result, the MCU board 40c of the third modification may also include the frame generator 402 that sends the TOD/PPS information frame 90 for sending the shared PPS information to the slave mode interface boards 10. TOD and shift bit information is sent to the slave mode interface boards 10 through the intra-device time synchronization software 4062c in the third modification. As a result, effective information or ineffective information (or dummy or null information) may be stored in the fields of the TOD/PPS information frames 90 sent by the MCU board 40c of the third modification to the slave mode interface boards 10.

As described above, sending and receiving of information transmitted using the TOD/PPS information frames 90 may be conducted through software processing according to the interface boards 10 and the MCU board 40c of the third modification. Thus, the interface boards 10 and the MCU board 40c of the third modification can conduct similar operations as the abovementioned interface boards 10 and the MCU board 40. As a result, the various abovementioned effects can be achieved.

The present invention is not limited to the abovementioned embodiments, and various modifications within the scope and gist of the present invention as understood from the scope of the claims and the description may be made, and communication systems, communication interfaces and synchronization methods included in such modifications may also be included within the technical scope of the present invention.

Suitable synchronization between multiple communication interfaces included in a communication system can be achieved according to the communication systems, communication interfaces, and synchronization methods described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A communication system comprising:
a first interface board and a second interface board that send and receive data respectively,
the first interface board including:
a first synchronizer that synchronizes a first time that is the time of the first interface board to a base time based on a master synchronization signal that is supplied by an external master time source and that defines the base time,
a first comparator that compares a phase of a first synchronization signal that synchronizes the first time, with a phase of a shared synchronization signal, and
a first notifier that notifies the second interface board of a comparison result of the first comparator,
the second interface board including a second synchronizer that synchronizes a second time that is the time of the second interface board to the base time based on the comparison result notified from the first notifier; and
an interface controller that controls the first and second interface boards respectively, the interface controller including a transmitter that sends the shared synchronization signal inside the communication system to the first and second interface boards.

2. The communication system as in claim 1,
wherein the first synchronizer includes a real time clock ("RTC") that outputs a pulse per second as the first synchronization signal, and
wherein the first comparator compares the phase of the first synchronization signal with the phase of the shared synchronization signal at a high frequency clock signal precision corresponding to a resolution performance of the RTC.

3. The communication system as in claim 2,
wherein the transmitter sends a base clock signal with a frequency that becomes a standard for operations of the communication system and that has a frequency lower than the frequency of the high frequency clock signal,
wherein the first interface board further includes a first generator that generates a high frequency clock signal with a frequency higher than the base clock signal by frequency-dividing the base clock signal, and
wherein the first comparator compares the phase of the first synchronization signal with the phase of the shared synchronization signal at the high frequency clock signal precision.

4. The communication system as in claim 1, wherein the second synchronizer synchronizes the second time to the base time by synchronizing the second time to a timing that shifts the shared synchronization signal sent by the interface controller by a phase difference indicated by the comparison result notified by the first notifier.

5. The communication system as in claim 1,
wherein the first synchronizer outputs the first synchronization signal to the first comparator, and
wherein the first comparator and the first synchronizer are coupled without another processing unit that conducts certain arithmetic processing on the first synchronization signal interposed therebetween.

6. The communication system as in claim 1, wherein the first notifier notifies the second interface board of the comparison result using a frame signal that is sent at fixed intervals and that conforms to a certain frame format.

7. The communication system as in claim 1, wherein the first notifier further includes a processor, and the processor performs notifying the second interface board of the comparison result.

8. The communication system as in claim 1,
wherein the first notifier notifies the second interface board of the comparison result through the interface controller, and
wherein the transmitter (a) notifies the comparison result using one of a frame signal and a data signal that are sent at fixed intervals and that conform to a certain frame format, and (b) makes a notification timing of one of the frame signal and the data signal based on the shared synchronization signal.

9. The communication system as in claim 1,
wherein the interface controller includes
an acquirer that obtains the master synchronization signal from the master time source,
a second comparator that compares the phase of the master synchronization signal with the phase of the shared synchronization signal sent by the interface controller, and
a second notifier that notifies the first and second interface boards of a comparison result of the second comparator,
wherein the first synchronizer synchronizes the first time to the base time based on the comparison result notified by the second notifier, and
wherein the second synchronizer synchronizes the second time to the base time based on the comparison result notified by the second notifier.

10. The communication system as in claim 9,
wherein the first synchronizer includes a real time clock (RTC) that outputs a pulse per second (PPS) as the first synchronization signal, and
wherein the second comparator compares the phase of the master synchronization signal with the phase of the shared synchronization signal at a high frequency clock signal precision corresponding to a resolution performance of the RTC.

11. The communication system as in claim 10,
wherein the interface controller further includes a second generator that generates a high frequency clock signal with a frequency higher than the frequency of the base clock signal by frequency-dividing the base clock signal with a frequency lower than a standard for operations of the communication system and lower than the frequency of the high frequency clock signal, and
wherein the second comparator compares the phase of the master synchronization signal with the phase of the shared synchronization signal at the high frequency clock signal precision.

12. The communication system as in claim 9,
wherein the second notifier is included in the transmitter, and
wherein the transmitter (a) notifies the comparison result using one of a frame signal and a data signal that are sent at fixed intervals and that conform to a certain frame format, and (b) makes a notification timing of one of the frame signal and the data signal based on the shared synchronization signal.

13. The communication system as in claim 1,
wherein the transmitter sends delay time information that indicates a delay time dependent upon a transfer path between the interface controller and the respective first and second interface boards, to the respective first and second interface boards, and
wherein the second synchronizer synchronizes the second time to the base time based on at least one of the comparison result notified by the first notifier and the delay time information sent by the transmitter.

14. The communication system as in claim 1,
wherein the communication system includes a plurality of first interfaces,
wherein the interface controller further includes a selector that (a) compares the phase of the first synchronization signal with the phase of the shared synchronization signal and (b) selects one of the first interfaces that notifies the result from the plurality of first interfaces based on a priority list that indicates priority among the plurality of first interfaces,
wherein the selected one of the first interfaces selected by the selector from the plurality of first interfaces (a) compares the phase of the first synchronization signal with the phase of the shared synchronization signal, and (b) notifies the comparison result, and
wherein another first interface not selected by the selector from the plurality of first interfaces (a) does not compare the phase of the first synchronization signal with the phase of the shared synchronization signal, and (b) does not notify the comparison result.

15. The communication system as in claim 14, wherein the selector selects another first interface with the next highest priority following the priority of the one of the first interfaces based on the priority list, when an abnormal state occurs in the currently selected one of the first interfaces.

16. The communication system as in claim 1,
wherein the interface controller further includes a timing defining unit that defines a timing to compare the phase of the first synchronization signal with the phase of the shared synchronization signal and to notify the comparison result,
wherein the transmitter sends the shared synchronization signal at the timing defined by the timing defining unit,
wherein the first interface board compares the phase of the first synchronization signal and the phase of the shared synchronization signal and notifies the comparison result at the timing defined by the timing defining unit, and
wherein the second interface board synchronizes the second time to the base time at the timing defined by the timing defining unit.

17. An interface board comprising:
a synchronizer that synchronizes a first time that is a time of the interface board to a base time based on a master synchronization signal that is supplied by an external master time source and that defines the base time;
a comparator that compares a phase of a first synchronization signal that synchronizes to the first time with a phase of a shared synchronization signal sent by an interface controller that controls the interface board; and
a notifier that notifies another interface board of a comparison result of the comparator.

18. An interface board that synchronizes a first time that is the time of the interface board to a base time based on a master synchronization signal that is supplied from an external master time source and defines the base time, compares a phase of a first synchronization signal that synchronizes to the first time and a phase of a shared synchronization signal sent by an interface controller that controls the interface board, and operates in relation to another interface board to which a comparison result is notified, the interface board comprising:
an obtaining means for obtaining the comparison result notified by the another interface board, and
a synchronizer that synchronizes a second time that is the time of the interface board to the base time based on the comparison result obtained by the obtaining means.

19. A transfer method for a communication system including a first interface board and a second interface board that conduct sending and receiving of data, and an interface controller that controls the first and second interface boards, the method comprising:
sending a shared synchronization signal shared within the communication system from the interface controller to the first and second interface boards;
synchronizing a first time that is the time of the first interface board to a base time based on a master synchronization signal that is supplied from an external master time source and that defines the base time;
comparing a phase of a first synchronization signal that synchronizes to the first time and a phase of the shared communication signal;
notifying a comparison result from the comparing to the second interface board; and
synchronizing a second time that is the time of the second interface board to the base time based on the comparison result notified by the notifying.

* * * * *